United States Patent
Underwood et al.

(10) Patent No.: US 9,832,213 B2
(45) Date of Patent: Nov. 28, 2017

(54) SYSTEM AND METHOD FOR NETWORK INTRUSION DETECTION OF COVERT CHANNELS BASED ON OFF-LINE NETWORK TRAFFIC

(71) Applicant: Cyber Crucible Inc., Severna Park, MD (US)

(72) Inventors: Dennis Underwood, Glen Burnie, MD (US); Ethan Stryker, Columbia, MD (US); Jonathan Peterson, Odenton, MD (US)

(73) Assignee: Cyber Crucible Inc., Severna Park, MD (US)

( * ) Notice: Subject to any disclaimer, the term of this patent is extended or adjusted under 35 U.S.C. 154(b) by 203 days.

(21) Appl. No.: 14/850,476

(22) Filed: Sep. 10, 2015

(65) Prior Publication Data

US 2016/0127395 A1    May 5, 2016

Related U.S. Application Data

(60) Provisional application No. 62/073,376, filed on Oct. 31, 2014.

(51) Int. Cl.
*G06F 21/00* (2013.01)
*H04L 29/06* (2006.01)

(52) U.S. Cl.
CPC ...... *H04L 63/1416* (2013.01); *H04L 63/1425* (2013.01); *H04L 63/1441* (2013.01)

(58) Field of Classification Search
CPC ............ H04L 63/1441; H04L 63/1416; H04L 63/1425
USPC ..................................................... 726/22–25
See application file for complete search history.

(56) References Cited

U.S. PATENT DOCUMENTS

| | | | |
|---|---|---|---|
| 8,516,586 B1 * | 8/2013 | Jensen | H04L 63/1425 713/153 |
| 2005/0108542 A1 * | 5/2005 | Kirovski | G11B 20/00086 713/176 |
| 2009/0094618 A1 * | 4/2009 | Huntsman | H04L 67/12 719/318 |

* cited by examiner

*Primary Examiner* — Anthony Brown
(74) *Attorney, Agent, or Firm* — Vector IP Law Group; Robert S. Babayi

(57) ABSTRACT

A network intrusion detection system and method is configured to receive off-line network traffic. The off-line network traffic with a predefined format, PCAP file, is capable of indicating existence of a plurality of covert channels associated with a corresponding plurality of covert channel signatures. Each covert channel comprises a tool that communicates messages by deviating from a standard protocol to avoid detection. A plurality of covert channel processors are configured to analyze off-line network traffic. The analysis determines whether the off-line network traffic deviates from the standard protocol based on one or more covert channel signatures. The covert channels are employed in at least one standard layer of the standard protocol stack and the off-line network data traffic comprises at least one standard protocol stack having multiple standard layers.

18 Claims, 17 Drawing Sheets

Covert Channel Processes Flowchart

Malware Processes Flowchart

SYSTEM AND METHOD FOR NETWORK INTRUSION DETECTION OF COVERT CHANNELS BASED ON OFF-LINE NETWORK TRAFFIC

FIELD OF THE INVENTION

The present invention relates generally to a system and method for preventing Advanced Persistent Threat (APT) and more particularly to detect and analyze network traffic off-line.

BACKGROUND OF THE INVENTION

Cyber-attacks have matured and evolved from unfocused, unsophisticated criminal activities to long-term campaigns against targeted entities using advanced attack tools. This type of cyber activity is known as Advanced Persistent Threat (APT) and it poses a significant danger to every business, government or military with data to protect from public disclosure. The costs of resolving APT attacks are also financially burdening to organizations. Expenses related to attack cleanup, however, pale in comparison to the long term costs associated with the disclosure of valuable intellectual property, confidential data, trade secrets, business plans, and other data targeted by cyber attackers focused on extracting intelligence from their targets. Loss of data managed by regulatory stipulations, such as consumer financials, the Health Insurance Portability and Accountability Act (HIPAA), Sarbanes Oxley, or military data, could result in significant fines and law enforcement action. The income loss and costs of re-establishing customer confidence once a data breach is publicly reported can be devastating.

After an APT cyber-attack has been discovered, the targeted entity requires immediate answers for timely cleanup, risk assessment, and regulatory compliance. They must quickly identify the stolen intellectual property or trade secrets, affected equipment and accounts, and attacker attribution as accurately as possible. However, ongoing public disclosures from businesses, military organizations and governments all over the world have revealed disturbing trends about APT attacks. Discovery of the cyber-attack usually goes unnoticed until security researchers observe a business' stolen data being sold or distributed by the attackers. At this point, the adversary has had long-term access to large portions of the target's intellectual property, personal information and/or classified data. Cyber-security equipment currently available does not prevent successful attacks, but instead delays intrusion, enables eventual discovery, and gives attack responders the tools required to investigate and remove a discovered attack. Attacked entities must wait for extensive forensic analysis and intrusion detective work before they can adequately respond to an attack, but sometimes receive only estimates of attacker activity.

Unlike naive, cybercrime focused malware, APT attack tools are complex and finite in number. They are often used for long periods of time with only minor adjustments. However, their communications messaging systems are complex and require cyber defenders to have advanced encryption, protocol, and malware analysis expertise. This makes it harder for regulatory agencies, law enforcement, and cyber-security service providers to counter the APT threats. In the meantime, APT attackers increase their capabilities' speed, detection evasion, and cleanup counter-attack techniques. A poorly executed intrusion response which gives the attacker time to react, may only result in existing attack tools being replaced with more advanced versions in different locations inside the business.

Unwanted software bundling is where unscrupulous companies confuse users into installing unwanted programs that can compromise a user's privacy or weaken their computer's security. Companies often bundle a wanted program download with a wrapper application that forces the user to install an unwanted application, while making it hard for the user to find how to opt-out. Nearly every single third-party free download site bundles their downloads with potentially unwanted software.

Antivirus companies define the software bundled as potentially unwanted programs (PUP), which can include software that displays intrusive advertising, or tracks the user's internet usage to sell information to advertisers, injects its own advertising into web pages that a user looks at, or uses premium SMS services to rack up charges for the user. Unwanted programs often include no sign that they are installed, and no uninstall or opt-out instructions. Some unwanted software bundles include software that installs a root certificate on a user's device, which allows attackers to intercept banking details without browser security warnings. The United States Department of Homeland Security has advised removing an insecure root certificate, because they make computers vulnerable to serious cyber-attacks.

There are known devices that attempt to detect Advanced Persistent Threat (APT) activity using a variety of techniques. Network security devices, which can be adjusted to collect specific attacks, including cyber-attack tool communications, are currently available. There exists network monitoring and attack discovery products and tools, including open source tools. Some cyber-security defense products such as Intrusion Detection Systems provide "fact of" alerts based on known attack-like behaviors or malware signatures. Many of these network-monitoring devices also have the capability of collecting the network traffic associated with alerting, as well as subscription services to ensure the latest detection capabilities are installed. However, these defense products do not extract the contents of the attack tool messages they discover or process malicious tool network activity to expose the details of the intrusion previously shown. Thus, the threat becomes even greater when APT attacks are discovered after operating against and maneuvering inside an organization for months or years.

It is known to analyze network traffic real-time, i.e., "on-line." Snort is a free and open source network intrusion prevention system (NIPS) and network intrusion detection system (NIDS). Snort has the ability to perform real-time traffic analysis and packet logging on Internet Protocol (IP) networks. Snort performs protocol analysis, content searching, and matching. Snort detects attacks to operating systems, fingerprinting attempts, common gateway interface, buffer overflows, server message block probes, and stealth port scans. Snort performs packet inspection, intrusion detection progression and intrusion prevention on protocol standards, protocol anomaly detection, application control, and signature matching. Snort analyzes application-level vulnerabilities including binary code in HTTP headers, HTTP/HTTPS tunneling, URL directory traversal, cross-site scripting, and SQL injection will also be analyzed.

Covert channels, which are used as a medium by adversaries for sending malware to victims of cyber-attack, are known, for example, DNS tunneling. In a DNS tunnel, data are encapsulated within DNS queries and replies, using base32 and base64 encoding, and the DNS domain name lookup system is used to send data hi-directionally. Botnets can use DNS tunneling to act as a covert channel, which are hard to detect. The only way to identify covert channels is by looking for Command and Control DNS messages. Attackers use DNS tunneling tools to create covert channels.

"Suricata" is a multi-threaded malware command and covert channel detector. Suricata uses malware processors or engines to monitor network IDS, IPS, and security. Suricata balances malware processing load across multiple processors. Suricata recognizes common protocols as a stream starts, thus allowing rule writers to write a rule to the protocol. Suricata can match on protocol fields, which range from HTTP URI to a SSL certificate identifier. Suricata can handle Off port HTTP, CnC channels, file identification, MD5 checksums, and file extraction. Suricata can identify malware file types crossing a network. Files can be tagged for extraction and store metadata files describing a capture situation and flow. The file's MD5 checksum is calculated on the fly so that a list of md5 hashes can be found.

US Patent Publication No. 2004-0107361 discloses a network intrusion detection system for detection of an intrusion through the analysis of data units on a network connection. U.S. Pat. No. 7,356,736 discloses a simulated computer system for monitoring of software performance. U.S. Pat. No. 5,765,030 discloses a processor emulator module having a variable pre-fetch queue size for program execution. U.S. Pat. No. 7,093,239 discloses a computer immune system and method for detecting unwanted code in a computer system. US Patent Publication No. 2010-0100963 discloses a system and method for detecting and preventing attacks and malware on mobile devices such as cell phones, smartphones or PDAs, which are significantly limited in power consumption, computational power, and memory. US Patent Publication No. 2008-0022401 discloses an apparatus and method for multicore network security processing. U.S. Pat. No. 7,076,803 discloses integrated intrusion detection services. U.S. Pat. No. 6,851,061 is a system and method for intrusion detection data collection using a network protocol stack multiplexor. US Patent Publication No. 2003-0084319 discloses node, method and computer readable medium for inserting an intrusion prevention system into a network stack. U.S. Pat. No. 6,775,780 discloses detecting malicious software by analyzing patterns of system calls generated during emulation.

FIG. 1 depicts an exemplary system under threat by a plurality of malware, covert channel, steganography, and PUP servers. APT attacks are typically conducted in predictable stages. The attacker first, gains access to a machine on the network. This can be done in a variety of ways, including spear phishing. Spear phishing is the tactic of sending fraudulent emails to targeted company personnel. These emails appear to be from a trusted, legitimate source and trick the employee into performing an action that allows an attacker's malicious tool to be installed. Second, the attacker installs a small malicious tool designed to allow limited access to a victim for later use in an ongoing attack. This tool is likely immune to antivirus. Third, the attacker uses the original small malicious tool to install a larger fully featured malicious tool, which is also likely immune to antivirus. This tool will conduct a variety of tasks for the attacker, including spreading to other users and equipment and transmitting stolen confidential data back to the attacker. Fourth, the attacker spreads throughout the network to ensure long-term access to the organization, steal vital secrets at will, and upgrade the attack tools to stay one step ahead of cyber-security analysts and tools.

Every step through the APT attack requires network communication with the attacker or infrastructure controlled by them. As the attack against a target continues from stage 1 through stage 4, communications become larger with more information about the attack itself. Attackers need means of managing their attack, sending commands to the individual victim machines, and receiving stolen data from the target. Additionally, as the attack matures through stage 4, these communications increase in stability and complexity. The full-featured malicious tools used in stage 3 and 4 are designed to last the duration of an attack, for months or years, and are complex enough to evade most naive detection techniques while managing an advanced cyber-attack campaign. There exist application programming interfaces (APIs) for capturing network traffic. Unix-like systems implement PCAP in their "libpcap" libraries. Windows systems use a port of "libpcap" known as "WinPcap." Network traffic monitoring software may use libpcap and/or WinPcap to capture packets traveling over a network. In newer versions of the software, libpcap or WinPcap capture packets at a link layer. The PCAP API is written in C, so other languages such as Java, .NET languages, and scripting languages generally use a wrapper. Captured network communications from Advanced Persistent Threat (APT) attack tools contain information vital to both attacker and target. These tailored messages almost always contain information about both the target and the attacker; such information includes victim machine Information, victim user information, stolen (also called exfiltrated) intellectual property, attacker identifying information, attacker actions taken against the target, and attacker tool information, such as date of original attack.

It is known to analyze network traffic non-real-time, i.e., "off-line." For example, "ChopShop" is a framework developed by the MITRE Corporation. Malware processors are known for delivering robust defense against malicious attacks. Malware processors are configured to operate based on known or developed malware signatures for detection and analysis. A malware signature is an algorithm or hash (a number derived from a string of text) that uniquely identifies a specific virus. A signature may be static which, in its simplest form, is a calculated numerical value of a snippet of code unique to the malware. A signature may also be behavior-based, i.e. if the malware tries to do X, Y, Z, flag it as suspicious. The signature can be unique string of bits, or the binary pattern, of a virus. For example, a virus signature is like a fingerprint in that it can be used to detect and identify specific viruses. Anti-virus software uses the virus signature to scan for the presence of malicious code. ChopShop APT tools provide processing and analyzing very limited number of malware signal for network-based protocol decoders that enable security professionals to understand actual commands issued by or issued to malware controlling endpoints, i.e., malware servers shown in FIG. 1. Also known in cyber security are covert channels. In one example, covert channel controlling endpoints, i.e., covert channel servers shown in FIG. 1, create proprietary communication channels between controlling endpoints. As used herein, a covert channel is an attack tool that communicates messages by deviating from a standard protocol to avoid detection. A covert channel deviation can be at any one or more layers of a standard protocol stack. A malware is an attack tool against a target that uses the standard protocol stack for message communication without deviation from the standard protocol.

Also known in cyber security are other attacks including as steganography. Malicious tools use numerous methods to hide large volumes of information inside files that appear harmless and legitimate, a practice known as steganography. Some such methods use algorithms to hide the data, which the invention is able to extract in near real time. There are also steganographic techniques, which require discovery or disclosure of the cryptographic variables or keys before extraction of the hidden information.

The invention utilizes a variety of cryptographic and forensic techniques to attack encryptions in use by a steganography-wielding malicious tool and extract the hidden information. Some cryptographic and steganographic techniques are unique and will require custom functionality to identify the cryptographic variables necessary for decryption. Other techniques follow standard decryption tradecraft employed by the invention, allowing processing to use standardized cryptographic attacks.

Also known in cyber security are other attacks including PUP. There are known browser toolbars or programs that the user can be enticed to install, which the user "agreed" to give the business all of their daily activities and data. A user would not normally agree to install such a program, or did not know they were agreeing to give their daily activity, for example, making it a potentially unwanted program (PUP). PUPs are installed on the machine at the network layer by some system-monitoring tool. Firewall detects the PUP and sends it to the administrator. The administrator determines if the program is wanted or unwanted on the server. A program that is wanted can also be unwanted by the owner of the network. Running heuristic analysis is also possible, which would mostly be focused on the administration tool focused PUP. Most antivirus programs that use heuristic analysis perform this function by executing the programming commands of a questionable program or script within a specialized virtual machine, thus permitting the anti-virus program to internally simulate what would happen if the suspicious file were to be executed while keeping the suspicious code isolated from the real-world machine. It then analyzes the commands as they are performed, monitoring for known viral activities such as replication, file overwrites, and attempts to hide the existence of the suspicious file. If one or more virus-like actions are detected, the suspicious file is flagged as a possible virus, and the user alerted. Another common method of heuristic analysis is for the anti-virus program to decompile the suspicious program, and then analyze the source code within it. The source code of the suspicious file is compared to the source code of known viruses and virus-like activities. If a certain percentage of the source code matches with the code of known viruses or virus-like activities, the file is flagged, and the user alerted.

The other side of PUP includes the administration tools, like telnet (a user command and an underlying TCP/IP protocol for accessing remote computers), RDP (a proprietary protocol that provides a user with a graphical interface to connect to another computer over a network connection), FTP (a standard network protocol used to transfer computer files from one host to another host over a TCP-based network, such as the Internet), or any other administration tool, that are very powerful administration tools used in almost every network. They are also extremely useful to hackers. The administrator cannot easily tell what the PUP (administration tool) is actually doing, aside from noting, for example, that there are no employees in China when seeing a Chinese IP address used. The system will be decoding these protocols as well, to expose the activities being conducted during these "potentially unwanted" administration activities.

The serious need to combat APT attacks on government, business, and military networks has been recognized. Enormous resources are required for conducting advanced technical analysis necessary to understand attacks, which must take into account various governmental regulatory requirements. For example, developers of cyber security products in the U.S. must comply with State Department and U.S. Department of Defense regulations under International Traffic in Arms Regulations (ITAR).

APT attacks require comprehensive reports accurately detailing the activities of the attacker, the affected users and machines, the stolen intellectual property, and clues as to the attacker attribution and motives. Additionally, information technology personnel require a comprehensive view of all affected equipment to lessen the chance that attackers could observe and evade removal attempts through coordinated cleanup strategies. Therefore, there exists a need for a robust system that defends against APT attacks.

SUMMARY OF THE INVENTION

Figure 1:
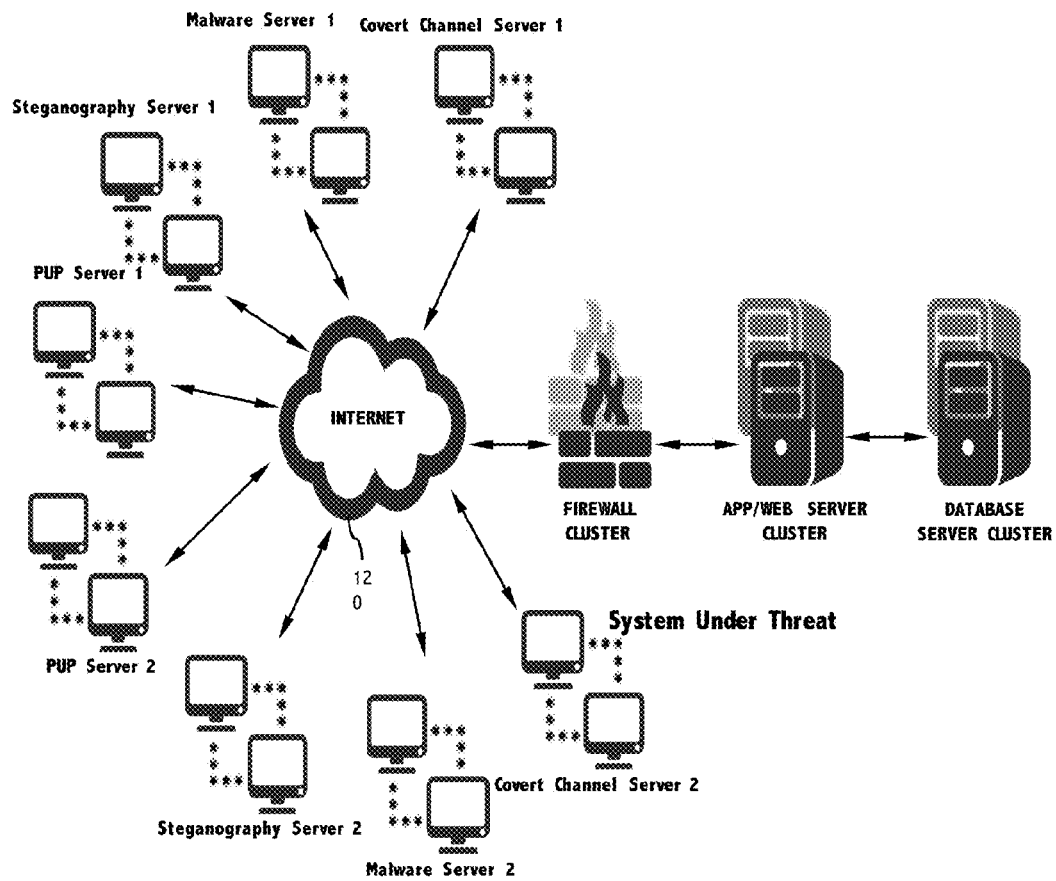
FIG. 1 depicts an exemplary system under threat by a plurality of malware, covert channel, steganography, and PUP servers.

Briefly, according to the present invention, a network intrusion detection system and method is configured to receive off-line network traffic. The off-line network traffic with a predefined format, PCAP file, is capable of indicating existence of a plurality of covert channels associated with a corresponding plurality of covert channel signatures. Each covert channel comprises a tool that communicates messages by deviating from a standard protocol to avoid detection. A plurality of covert channel processors are configured to analyze off-line network traffic. The analysis determines whether the off-line network traffic deviates from the standard protocol based on one or more covert channel signatures. The covert channels are employed in at least one standard layer of the standard protocol stack and the off-line network data traffic comprises at least one standard protocol stack having multiple standard layers. According to some of the more detailed features of the invention, a plurality of malware processors are configured to analyze off-line network traffic to detect malware, where a malware uses the standard protocol without deviation. Also, a plurality of steganography processors are configured to analyze off-line network traffic to detect steganography. Moreover, a plurality of Potentially Unwanted Program (PUP) processors are configured to analyze said off-line network traffic to detect PUPs. Furthermore, at least one standard layer comprises of HTTP or TCP/IP. According to other more detailed features of the invention, the off-line network traffic is analyzed at two levels: a first level and a second level. At the first level analysis, a deviation is detected based on a covert channel signature. At the second level, analysis comprises of at least one of decryption processes, key-in processes, administration detection processes, header checking processes, or field checking processes in the standard.

DETAILED DESCRIPTION OF THE INVENTION

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

The present invention can identify and understand the custom network messages being transmitted between targets and attackers allowing targeted organizations to have access to automatically, or semi-automatically generated reports that detail affected users and machines, commands being sent to a target, stolen data, and clues as to the attacker. The report provides the exact quantity and the names of all infected machines, the number of machines being used as staging areas of the attacker, the precise number of user accounts currently being accessed by the attacker, information on the attacker's current activities and observations on what data has been stolen, information regarding how the attacker tools are labeled, the date of the first infection, and information regarding additional tools the attacker has installed as a backup plan in case of discovery and clean up attempts by the business. Reports on the intrusion can be delivered to leadership and intrusion responders for a coordinated organization-wide cleanup, likely faster than attackers have a chance to move or upgrade their malicious tools.

The present invention processes malicious tool's communications through programs that understands an attacker's custom network messaging, and reporting of the extracted intelligence to business leadership. As described below, the present invention provides a subscriber service that decodes, extracts, and reports valuable victim and attack information found inside the attacker's network communications. More specifically, the present invention takes advantage of weaknesses to APT attacks. The present invention uses a unique set of advanced tools to exploit against APT attacks to provide a targeted entity near real-time answers or clues to the affected equipment and users, attacker identification or goals, stolen data, and attacker activities.

The present invention makes use of network cryptographic (code-breaking) analysis, custom network protocol (message) analysis, APT attack tradecraft knowledge across multiple attacker families, threat intelligence pursuit of a variety of APT attack tools, including familiarity with major law enforcement investigations and national security operations, enterprise network processing software engineering, cloud software engineering, and in-depth malware analysis including APT malicious tools.

In one embodiment, the present invention detects covert channels that deviate from a standard protocol to avoid detection. A covert channel deviation can be at any one or more layers of a standard protocol stack. The invention comprises covert channel processors configured to identify and extract covert channels from any layer of the standard protocol stack by processing captured network traffic in non-real-time (off-line network traffic). In another embodiment, in addition to covert channels, the invention comprises malware processors configured to identify and extract malware. In contrast to covert channels, malware use the standard protocol stack without deviation.

The invention is a system for network intrusion detection comprising one or more servers configured to receive an off-line network traffic data according to a predefined format. A plurality of processors associated with a corresponding plurality of covert channel signatures are configured to determine whether a communication protocol have deviated a standard. The off-line network data traffic comprises information regarding a standard protocol stack that comprises multiple layers of standard communication. The covert channel comprises a malware/attack tool employed in a layer of the protocol stack to provide an unauthorized channel for sending and receiving information without detection. Upon detection of a protocol deviation, the off-line network traffic is processed at a second level according to a plurality of second level over channel signatures. The second level covert channel signatures comprise decryption processes, key-in processes, administration detection processes, header checking processes, or field checking processes in the standard. The standard can for example comprise HTTP and TCP/IP. The invention also determines whether a malware is using standard protocols without deviation to avoid detection. The invention generates comprehensive reports accurately detailing the activities of the attacker, the affected users and machines, the stolen intellectual property, and clues as to the attacker attribution and motives.

Thus, the system of invention utilizes a two-phase processing involving triage at a first phase to eliminate false positives creating a high confidence test as to whether a full fledge processing is necessary at a second phase. The present invention adjusts templates to find new attacker signatures. In this way, attacker profile tools are adjustable automatically and change as new attack signatures are found.

Figure 2:
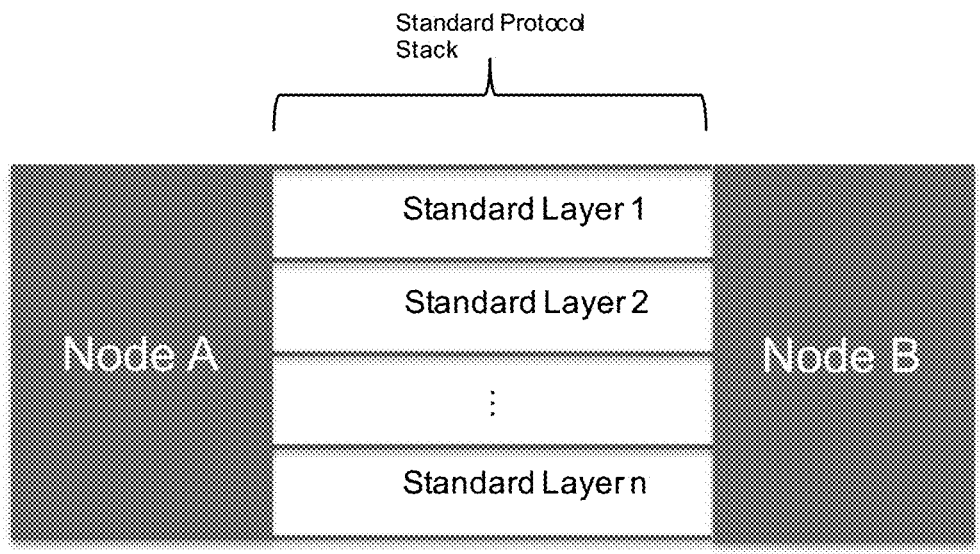
FIG. 2 depicts two network nodes that communicate with each other over a communication channel that is configurable according to a standard protocol stack.

FIG. 2 depicts two network nodes, A and B, which communicate with each other over a communication channel that are configurable according to a standard protocol.

As depicted, node A and node B communicate with each other over a standard protocol stack, such as those adopted for transport of packets over various networks. The examples of standard protocol stacks include the OSI reference model and TCP/IP. Standard protocol stack comprises a variety of standard layers 1 through n, such as application layer, transport layer, network layer, link layer, and physical layer.

Figure 3:
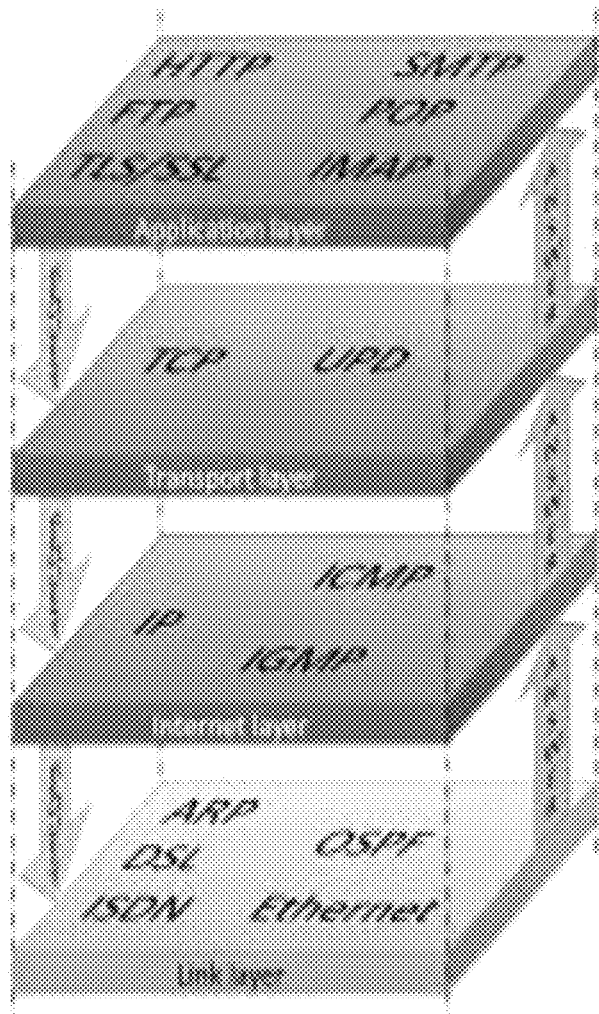
FIG. 3 depicts the standard protocol stack of FIG. 1 having multiple standard layers.

FIG. 3 depicts the standard protocol of FIG. 1 having multiple standard layers such as layers 1 through n. Exemplary standard layers at the application layer include: HTTP, FTP, TLS/SSL, SMTP, POP, and IMAP. Exemplary standard layers at the transport layer include: TCP and UPD. Exemplary standard layers at the network layer include: IP, ICMP, and IGMP. Exemplary standard layers at the link layer include: ARP, DSL, ISDN, OSPF, and Ethernet as well as any other wired or wireless standard link layers.

Figure 4:
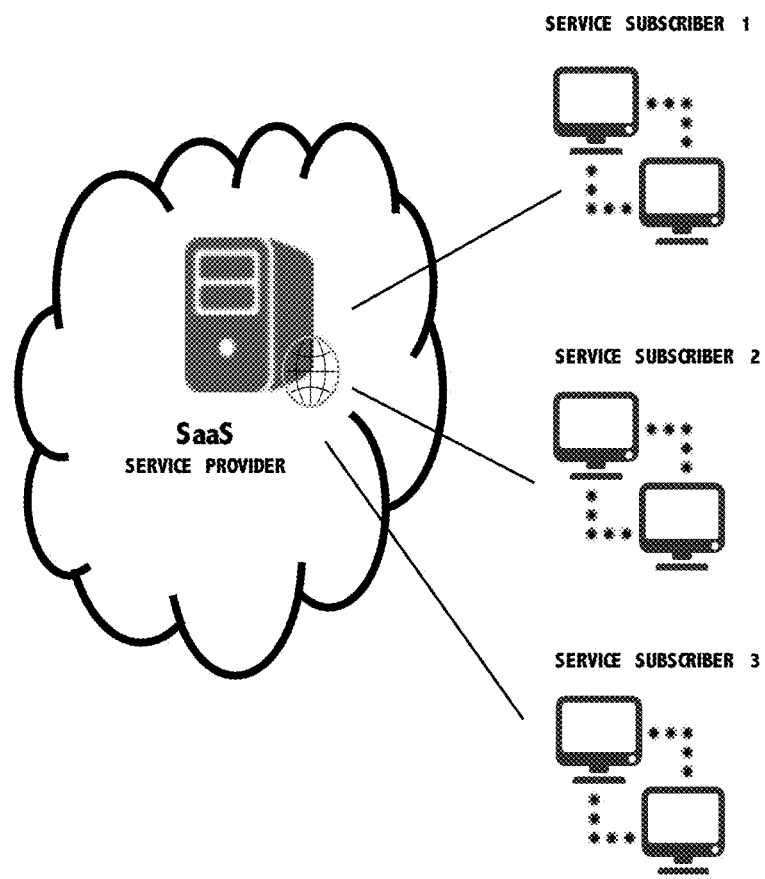
FIG. 4 depicts a block diagram of a system implementing the present invention on a Software-as-a-Service (SaaS) platform.

FIG. 4 depicts a block diagram of a system implementing the present invention on a Software-as-a-Service (SaaS) platform. SaaS is a software licensing and delivery model in which software is licensed on a subscription basis and is hosted centrally or distributed. The SaaS can offer a wide variety of services to subscribers including, but not limited to, health, financial, cyber-security, industrial, transportation, manufacturing, construction services. The SaaS platform comprises an Application/Web Server Cluster of one or more servers, which communicates with a Database Server Cluster of one or more databases.

The SaaS platform can be used to provide application services offered to multiple service subscribers. For example, a first and a second service subscriber can each offer independent application services to individuals or participants in an institution or organization over the Internet via a firewall Cluster of one or more firewalls. One such SaaS can be implemented on a cloud to serve various industries such as medical, fitness, financial, multimedia, transportation, logistics, or etc.

Generally, the network over which the present invention is implemented comprises a plurality of privately or publicly connected nodes, comprising one or more processor nodes, or servers or clusters of servers and or nodes, that are enabled to exchange information over one or more links. Exemplary networks comprise any one or more of WANs, LANs, PANs, Internet 120, as well as ad hoc networks such as Bluetooth or Extranets. The Internet 120 is a collection of interconnected (public and/or private) networks that are linked together by a set of standard protocols to form a global, distributed network. A node comprises one or more processor units (software or hardware, or virtual nodes) and/or devices located anywhere in the network that processes information and/or performs an attributed function. Any node or any component with a node can be virtualized in hardware or software. Different types of nodes can include a receiver node, which receives information, a processor node, which processes information, and a transmitter node, which transmits processed information. Examples of nodes include server nodes, client nodes, computer nodes, processor nodes, communication nodes, work stations, PDAs, mobile devices, entry nodes, exit nodes, user interface nodes, accounting nodes, administration nodes, content delivery nodes, selection nodes, sensor nodes, wired nodes, wireless nodes, and etc.

In one embodiment, the system of the invention comprises one or more servers configured to interface with a plurality of user devices over the network. The plurality of user devices can be one or more first user devices and one or more second user devices operating individually or in groups or sub-groups. The nodes of the system can be connected to each other according to any suitable network model, including but not limited to client server models as well as a hierarchical or distribution models. A link comprises any medium over which two nodes may communicate information with each other. Exemplary links include, but are not limited to, wired, fiber, cable, or wireless links (e.g., Bluetooth, UWB, USB, etc.). A communication channel comprises any channel used with a link for delivery of content, which can include data obtained from nodes, applications executing in nodes or devices, objects (e.g., vehicles, people), or sensors.

FIG. 4 shows a cloud service subscribed by three service subscribers. Each of the subscribers submits off-line network traffic to the SaaS for either full processing and intrusion report generation, or to receive notification that a malware protocol decoder exists for the malicious tool traffic submitted. After registration, customers will be able to submit a small amount of traffic to test against a decoder. Only corporate (non-free) email addresses may register. This allows marketing leads and prevents the tradecraft of attackers submitting sample traffic to security sites to check whether the malicious message decoder works against their tool.

Figure 5:
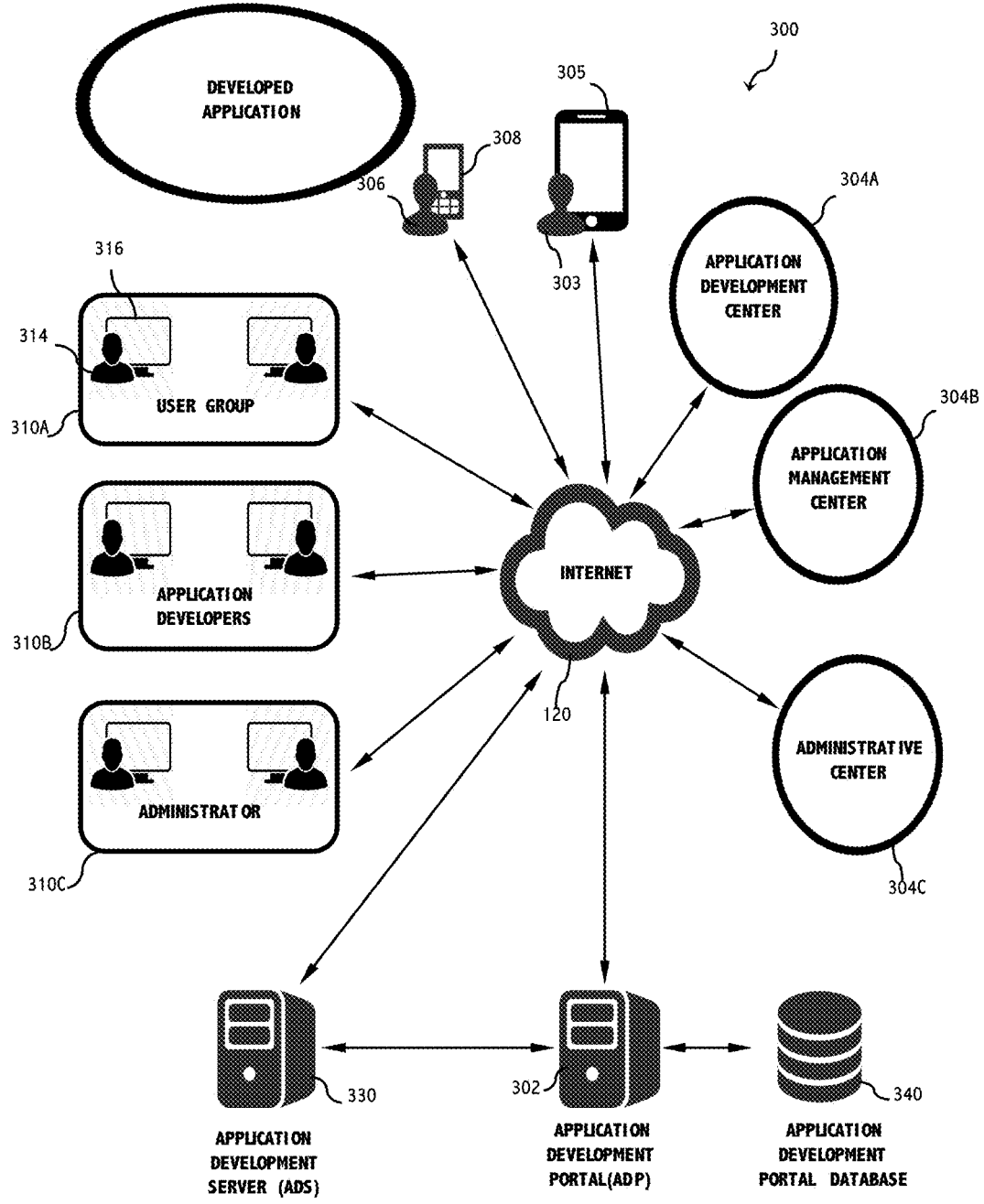
FIG. 5 depicts an exemplary block diagram of an application development system used in the SaaS of FIG. 4.

FIG. 5 depicts an exemplary block diagram of an application development system 300 used in the SaaS of FIG. 4 that develops various applications for users. Product delivery will consist of both a full-featured, cloud-based solution, and a less robust deployable solution for networks without Internet access. The deployable version is applicable for clients with regulatory or privacy concerns with sensitive organizational details. Since the only sensitive data transmitted for processing will be data currently in transmission to an attacker, use of the cloud-installed version of the product is more advantageous.

An application development center 304A, an application management center 304B and an administrative center 304C are connected to an application development portal (ADP) 302 through a network, such as the Internet 120. The ADP 302 provides a gateway between the user devices 305, 308, 316, the application development support centers 304A-C, and the application development system (ADS) 330 through the network 120. The ADS 330 provides the necessary user interfaces for application developers, reviewers, users, administrators and other participants' to communicate with one another, for example, allowing application development users/participants to interact with each other. Such application development may take place over cloud systems.

Users of developed applications can be individual users 303 or 306 (mobile devices 305 and 308), a user group 310A (or a user sub-group) of users 314 (fixed workstation 316). Users of the system can also be application developers 310B as well as administrators 310C and any other person that uses the system of FIG. 5 for developing or using applications. Such users can be professionals, developers, technical support, accounting, experts or any other participant in an application. The users 303, 306, 314 at the user devices 305, 308, 316 may include patients, doctors, health professionals, consultants, suppliers, application developers, content developers, financial institutions, insurance companies, etc. Alternatively, the user may be a responsible authority registered at the application development center 304A, the application management center 304B, or the administrative center 304C.

The ADP 302 provides access to an application portal database 340, which stores user information for all participants/users enrolled or associated with each application development process. The ADP 302 provides means for participants to log onto the application development server 330 with a user ID and password. Based on the access privilege associated with the user ID, the ADP 302 may authenticate the participant as a developer, an administrator, a reviewer, a health professional, teacher, student, or any other type of user, etc. Finally, the ADP 302 synchronizes the information stored between the ADS 330 and the support centers 304A-C. Through the environment created by the system and method of the present invention, an application can be served to users in a centrally or distributed hosted manner, for example on subscription basis or other for-profit or non-profit arrangement.

Figure 6:
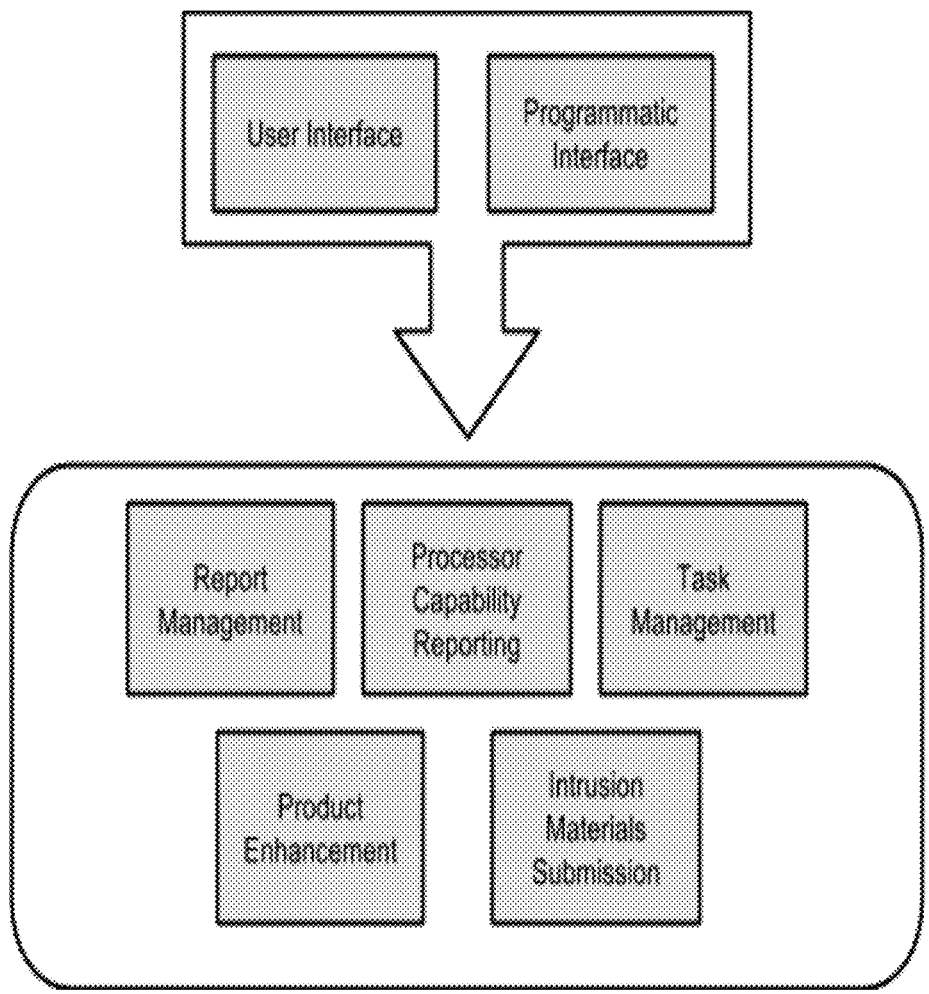
FIG. 6 depicts a block diagram of interfaces with various modules employed in the SaaS of FIG. 4.

FIG. 6 depicts a block diagram of interfaces with various modules employed in the SaaS of FIG. 4. The invention provides both Graphic User Interface (GUI) and programmatic access to the functionality of the product. The GUI leverages standard web technologies available on multiple operating systems. External programmatic access is available to users via standard web-driven technologies such as Representational state transfer (REST) and Simple Object Access Protocol (SOAP) interfaces. The use of standard web technologies allows interaction with the system via program or web browser, using widely available operating system platforms, web browsers, and programming languages. Additionally, the use of web standard technologies allows users to interact with the product remotely. While users may interact with invention solely via the GUI, the programmatic interface to the product provides users with developer resources to quickly submit materials, check task status, and receive reports as necessary. Large organizations and other heavy users may leverage the programmatic interface to enable seamless integration with their organization's security frameworks.

Figure 7:
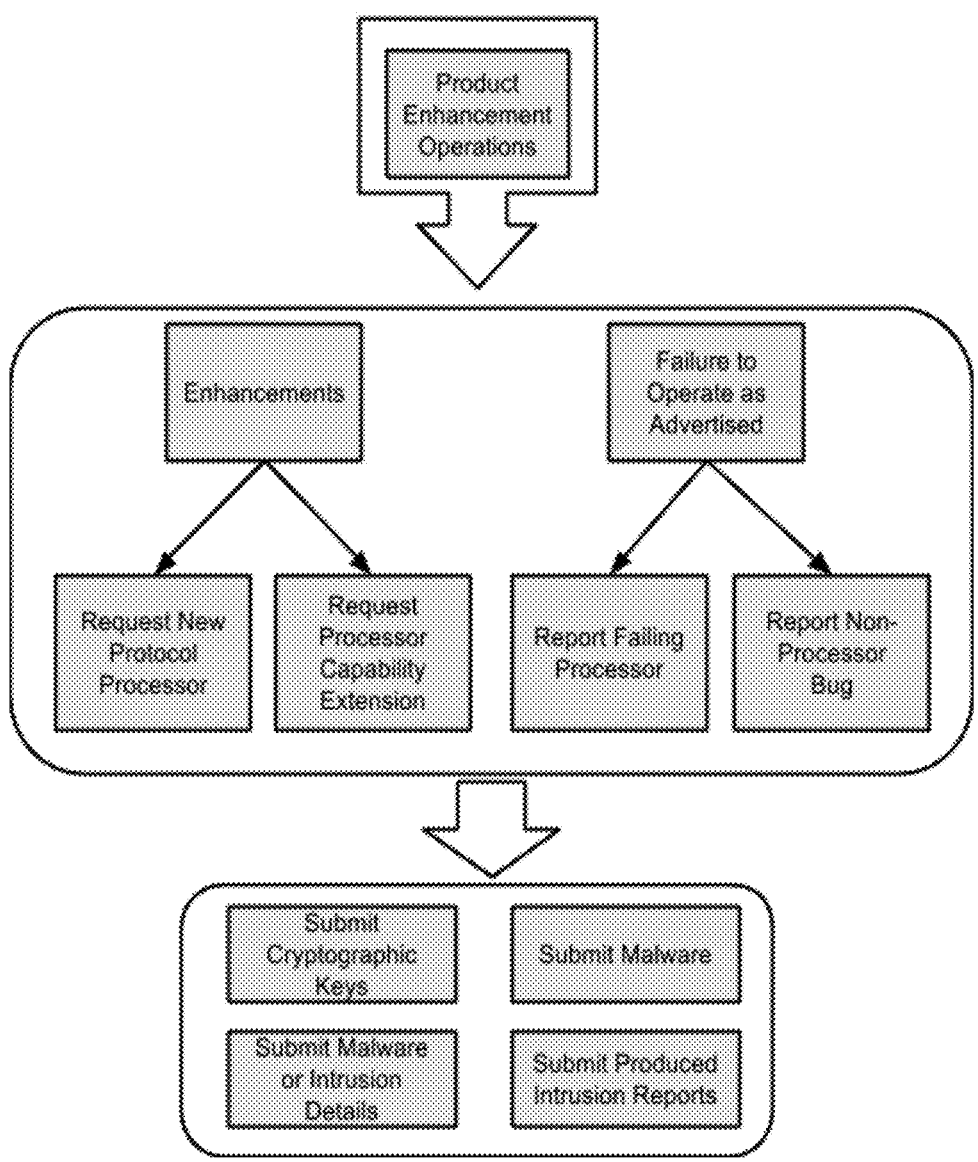
FIG. 7 depicts a block diagram of the product enhancement module of FIG. 6.

FIG. 7 depicts a block diagram of the product enhancement module of FIG. 6. The invention gives users the ability to influence the capabilities available through multiple functions classified as Product Enhancement. The invention's developers utilize the functionality requested by users through the Product Enhancement feedback mechanisms to help set and prioritize requirements. Product Enhancement feedback may be categorized as either a failure to operate as advertised or as enhancements to current capabilities. A failure to operate as advertised can be classified as either an error or absence of reported intrusion data for a processor, or an error in another part of the product functionality. Enhancements to current capabilities consist of requests for completely new intrusion message processors, or extensions to an existing intrusion message processor. Regardless of the type of failure or request for enhancement, the invention enables the user to submit supporting materials to enable developers to rapidly address user requirements. Material submissions may include: cryptographic keys, malware, malware or intrusion reports, produced reports, or other collateral information that may assist processing and report generation operations.

Figure 8:
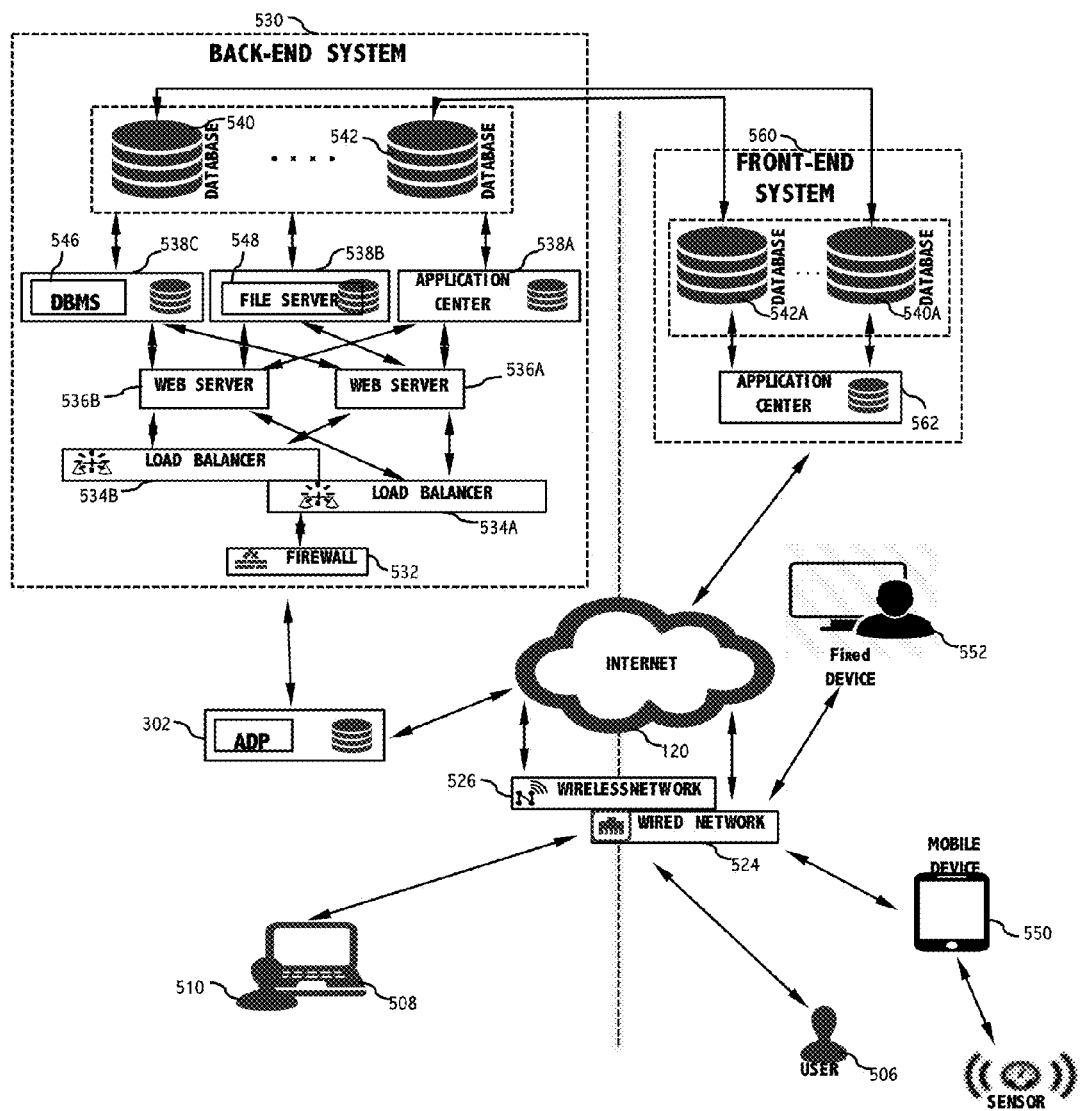
FIG. 8 depicts an exemplary block diagram of operation layers of the system of FIG. 1.

FIG. 8 shows an exemplary block diagram of operation layers of the system of FIG. 1 that implements the present invention on a developed application for a service subscriber. According to this embodiment, the system includes a back-end system 530 and a front-end system 560. The front-end system 560 provides user interfaces to subscribed service users and participants for accessing and using developed applications. The back-end system 530 is used for system administration, billing, marketing, public relations, etc. The front-end system 560 allows user access to application center 562, which accesses back-end databases 542A and 540A. The front-end system 560 provides the participants interactive access to users and user groups sessions via user devices 550 and 552. The users interface with the front-end and back-end systems 560 and 530 via the Internet 120 or through a wired network 524 and/or a wireless network 526. In the back end, the user devices 508 are connected to the ADP 302 via a network, which may be a private or public network. In an exemplary embodiment, the user devices execute a network access application, for example, but not limited to a browser or any other suitable application or applet, for accessing the back-end system 530 or the front-end 560, depending on defined access privileges which may be subject to multiple levels of administrative privileges under multiple levels of access control, according to for example various EAL levels. The users 510, 552, or 550 may be required to go through a log-in session and multiple levels of authentication before entering the system.

In the exemplary embodiment shown in FIG. 8, the back-end system 530 includes a firewall 532, which is coupled to one or more load balancers 534A, 534B. Load balancers 534A-B are in turn coupled to one or more web servers 536A-B. The web servers 536A-B are coupled to one or more application servers 538A-C, each of which includes and/or accesses one or more databases 540, 542, which may be central or distributed databases. Web servers 536A-B, coupled with load balancers 534A-B, perform load balancing functions for providing optimum online session performance by transferring subscribers, participant, users, developers, or administrators requests to one or more of the application servers 538A-C. The application servers 538A-C may include a database management system (DBMS) 546 and/or a file server 548, which manage access to one or more databases 540, 542. In the exemplary embodiment depicted in FIG. 7, the application server 538A and/or 538B provides applications to the participants 506, 510, 552 which includes electronic interfaces, application material, participant profiles, etc. Some of the content is generated via code stored either on the application servers 538A and/or 538B, while some other information and content is retrieved along with the necessary data from the databases 540, 542 via application server 538C. The application server 538B may also provide users 506, 510, 552 access to executable files which can be downloaded and installed on user devices 550, 508, 552 for creating an appropriate virtual application environment, with or without commercial, branding and or marketing features that are tailored for a particular application, a user or user groups.

The central or distributed database 540, 542, stores, among other things, the content and application material deliverable to the participants. The database 540, 542 also stores retrievable information relating to or associated with by various types of participants, developers, administrators, user groups, health professionals, teachers, students, application development center, application management center, the administrative center, user profiles, billing information, schedules, statistical data, progress data, social network data, user attributes, participant attributes, developer attributes, mass collaboration data, ranking data, compliance data, certification data, billing rules, third party contract rules, government requirements, etc. Any or all of the foregoing data can be processed and associated as necessary for achieving a desired objective associated with operating the system of the present invention. For example, statistical data related to conditions, user progress, schedules, and so on.

Figure 9:
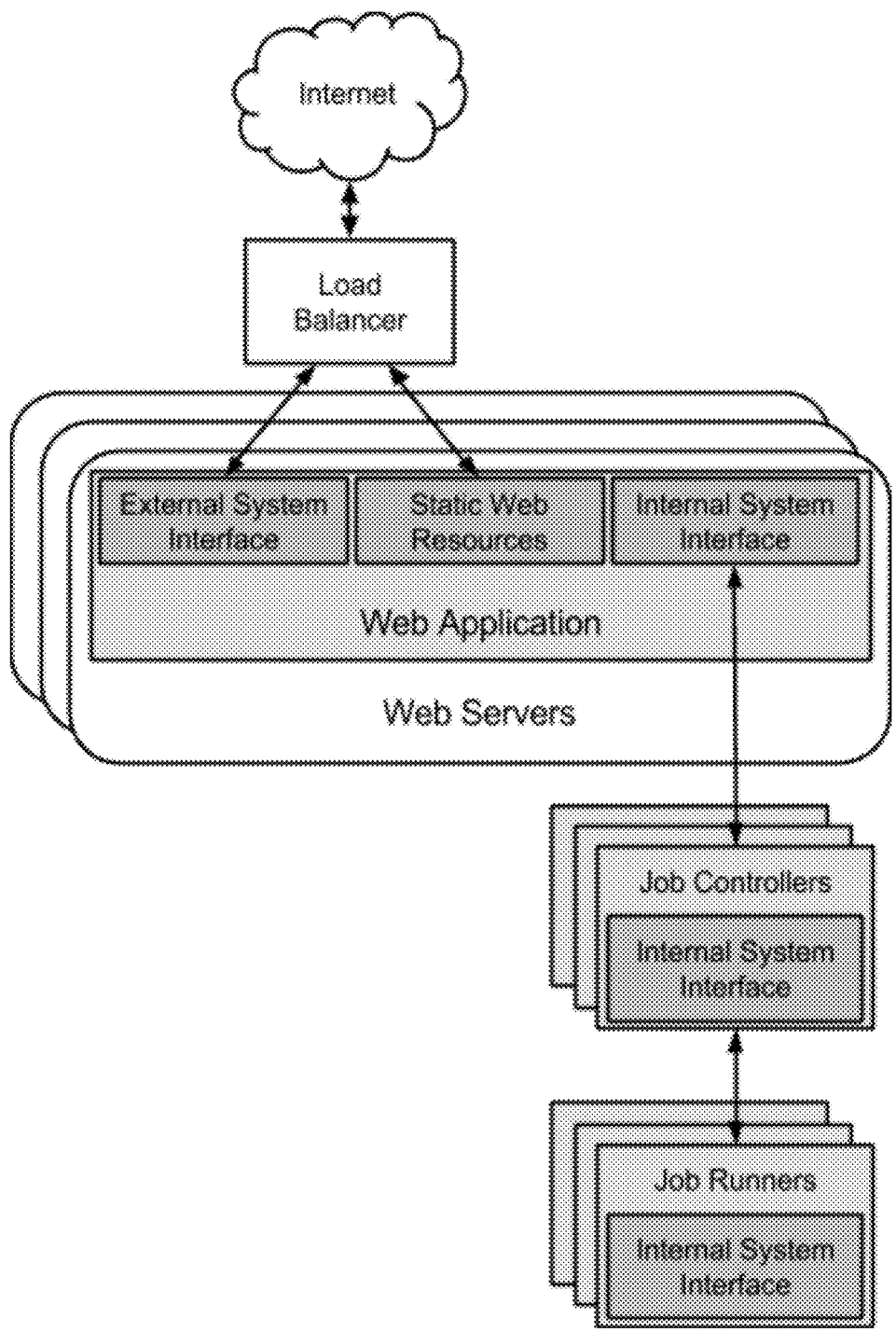
FIG. 9 is a diagram of a multi-processing system architecture implemented by web servers of FIG. 8.

FIG. 9 is a diagram of a multi-processing system architecture implemented by web servers of FIG. 8. The system is comprised of multiple subsystems: the Web Application, the Job Controller, and the Job Runner. Each of the subsystems are designed to be scaled horizontally and will be deployed on a cloud-based, platform-as-a-service provider. The entire system as a whole can run on a single machine. Alternatively, each instance of a subsystem is deployed to a distinct machine. The Web Application subsystem serves the external system interface and static web content to the end-user. It also communicates with and controls the Job Controllers using an internal communications interface. Access to the clustered web servers running the applications will be balanced with an off-the-shelf load balancing solution. The Job Controller subsystem maintains a queue of jobs as directed by the Web Application. Jobs are removed from the queue and assigned to Job Runner instances when their job processing slots become available. If the job queue grows too large, the Job Controller can request the platform-as-a-service provider to provision additional Job Runner instances. Inversely, if there are many Job Runner instances not being utilized, the Job Controller can deprovision these. The Job Runner subsystem executes jobs assigned from the Job Controller and returns the results. The malware detection logic will occur on the subsystem. A single Job Runner instance is designed to be multi-threaded for both processing of a single packet through multiple detection workflows and for processing multiple jobs concurrently.

Figure 10:
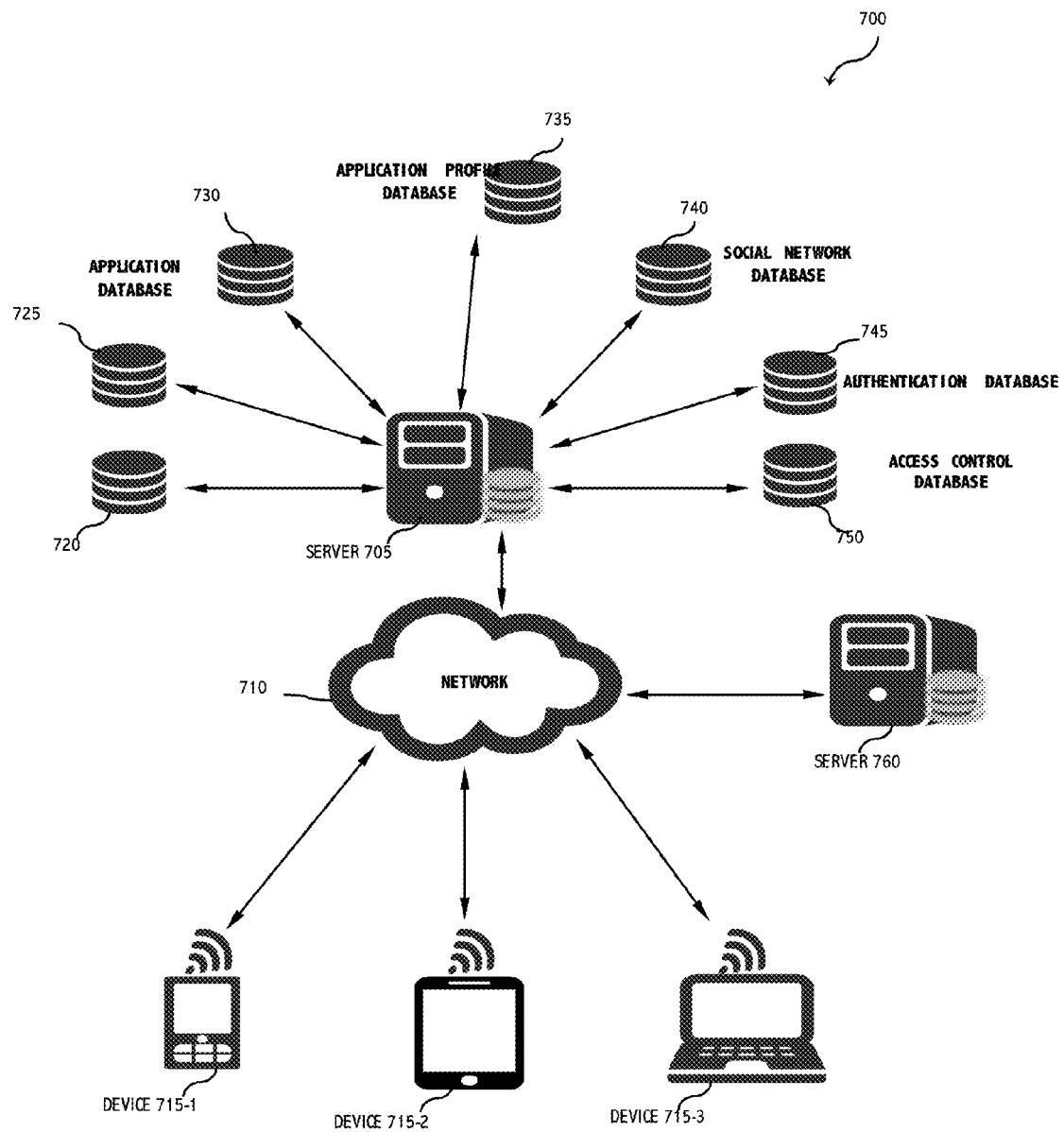
FIG. 10 depicts an exemplary diagram that implements authentication, and profiling into the SaaS of FIG. 4.

FIG. 10 depicts an exemplary diagram that implements authentication, and profiling into the SaaS of FIG. 4. In one embodiment, users of devices 715-1 through 715-n may register within a particular system and may connect to a network 710 (e.g. the Internet). Each of devices 715-1 through 715-n may be a computer, workstation, mobile device, a PDA, an iPad, a laptop computer, or etc. A server 705 may be maintained in a social networking system 700 may also include a server 760. Server 760 may include any combination of features of server 705. Server 760 may also be connected to the other parts of a social networking system 700 through network 710. Server 760 may be located on the same network as server 705 or on a different network as server 705. Server 760 may run or operate other instances the software used to provide the online collaboration system. Server 760 may run or be operated by other institutions or entities, either foreign or domestic. Server 760 may run or be operated by the same institution or entity but in separate locations, either foreign or domestic.

Server 705 may be connected to or include a number of databases, including a user profile database 720, a user database 725, an application database 730, an application profile database 735, a social network database 740, an authentication database 745, an access control database 750, or any combination thereof. The user profile 720 may store, for any user, content, weekly schedules, assignments, resources, due dates, discussions, reflections, content summaries, content reviews, tests, any other content or application material information, or any combination thereof.

User database 725 may store any information about users using the system. User database 725 may store an inventory of all users that are affiliated with a particular case, application, institution, or company. In one embodiment, such users are associated with network address, e.g., IP addresses that may be stored in a user's profile. User database 725 may store information about the users' names, user specific data and content, locations, addresses, information about the users entered by the users or developers or administrators, activities and interests of the users, education of the users, work experiences of the users, pictures of the users, etc., or any combination thereof.

Application database 730 may store any information about the application offered by the system 700. Application database 730 may store content and application names, identifiers, numbers, descriptions, health professionals, schedules, enrollments, past content, future content, number of users allowed to participate in a content or application, application structure, application or content prerequisites, user group, or any combination thereof.

Application profile database 735 may store information about users, or application, including information about users according to their role. For example, Application profile database 735 may store information about programs the patients have completed, activities the patients have completed, examples of health products the patients have completed, evaluations, rankings, or any combination thereof.

Social network database 740 may store social networking information about the users of the system. Social networking information may include contacts of the users to which the users are connected, circles of the users, chat connections of the users, chat histories of the users, communities of the users, contents and applications associated with the users, or any combination thereof. As used herein, a circle of a user means a set of other users associated with a user in the system. In one embodiment, the user may set its circles. As used herein, a community of the user may include any group or association of which the user is apart as identified by the system. Communities are different from contacts and circles because users cannot directly modify communities. Communities may be disbanded once a program or application ends, or past communities may be maintained. Social network database 740 may also store any other information elated to the social networking information.

Authentication database 745 and access control database 750 may store security, access, or authentication information for the system. Security or authentication information may include usernames of the users, passwords of the users, security questions used for verifying the identity of the users, answers to security questions, which parts of the system the users are able to access, or any combination thereof.

Figure 11:
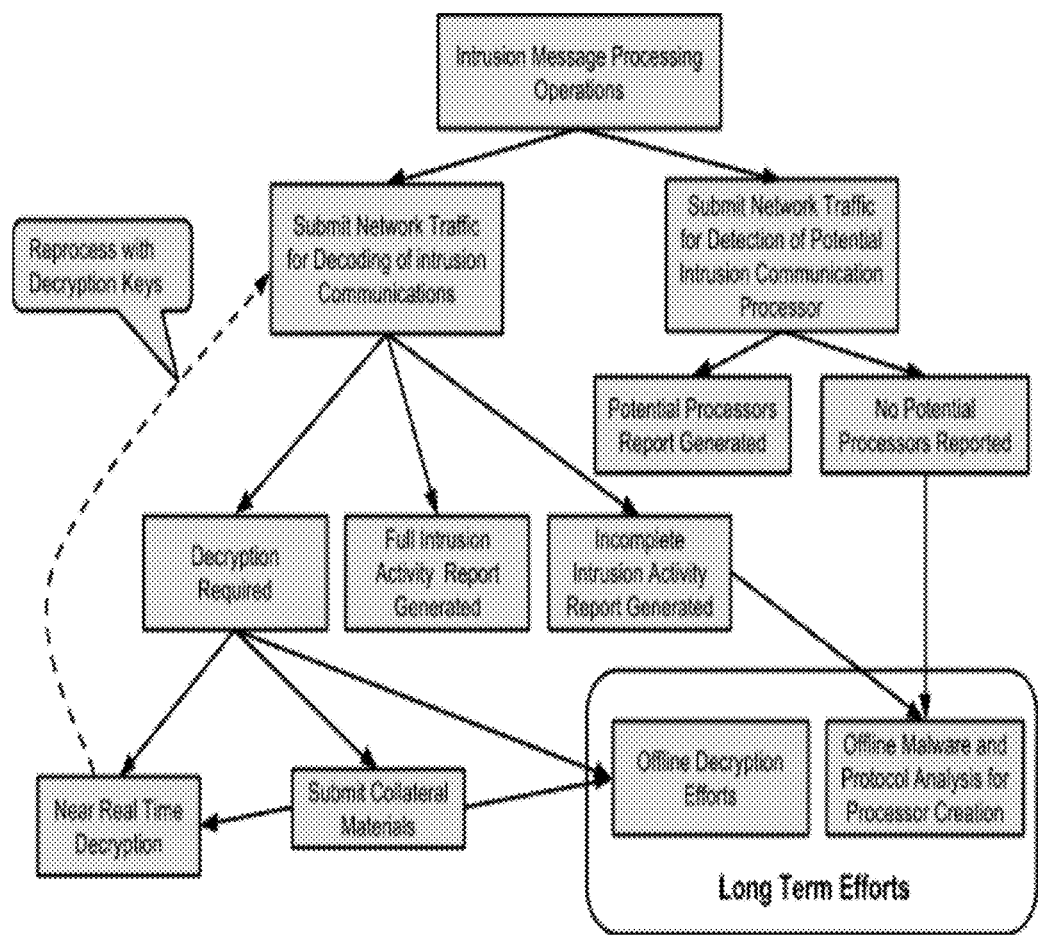
FIG. 11 is a block diagram depicting submission of intrusion materials for processing by the system of FIG. 1.

FIG. 11 is a block diagram depicting submission of intrusion materials for processing by the system of FIG. 1. The invention offers users the ability to submit off-line network traffic for either full processing and intrusion report generation, or to receive notification that a malware protocol decoder exists for the malicious tool traffic submitted. Users may submit off-line network traffic to detect whether at least one existing malicious tool traffic processor exists. After processing by the system, if a malicious tool is detected, a report is generated that identifies all potential processors and provides a list of current capabilities against that malicious tool. The detection capability is based on the list of high confidence, advanced initial detection capabilities built into the full malicious tool traffic processors, using all available advanced detection and processing methods. An empty report indicates the invention does not currently have any likely processing capabilities against the associated malicious tool traffic. The user then has the option of submitting a requirement for development of a processor capable of recognizing the user's submitted malicious tool traffic and processing it for intrusion activities, via the Product Enhancement Operations module. Otherwise, if the invention returns at least one candidate processor, the user has the option to submit the traffic for full processing and intrusion report creation.

Users may submit off-line network traffic for intrusion activities report creation and for details and activities listed for malicious tool traffic as identified in the Processor Capability Report. Upon submission, the invention begins determining applicable processors and begins processing traffic for report generation. This processing is immediately performed in the background, freeing the user to conduct other activities or leave the product site altogether. Processing may involve decoding, decryption or other advanced resource and time intensive activities, necessitating asymmetric processing and reporting operations with which users can check processing status via the Task Management interface. Additionally, a variety of advanced checks are performed during processing to ensure proper report detail generation occurs and that potential issues are highlighted to the user. Advanced checks during processing also aid in automated determination of the specific malicious tool used in the submitted off-line network traffic to ensure the most accurate report information is presented when multiple potential malicious tool processors are initially detected.

Successful processing of user submitted off-line network traffic results in the creation of intrusion data that matches the advertised capabilities of the Processor Capability Report for the malicious tool or tools generating the traffic. For instances where the advertised list of processor capabilities do not match all malicious tool capabilities or suspected collected activities, the user may submit a requirement via the Product Enhancement Operations module, for developers to create a new malware processor or enhance an existing one.

Malicious tool message processing may appear to work, but it does not successfully produce useful intrusion activity reports. The symptoms of this occurring are nonsensical data being entered into the reports, or reports missing data. This behavior may be caused by a variety of issues, including mis-identification of the chosen processor despite a variety of mid-processing verification checks, a new variant or customization of a malicious tool the invention has created a processing module for, or a software error in the processor. The user may submit a requirement via the Product Enhancement Operations module to investigate the source of the processing malfunction.

Some malicious tools may require advanced decryption processing. In this event, the invention will attempt to decrypt using a variety of techniques including cryptographic attacks, key discovery, and the use of cryptographic keys observed in other samples of the same malicious tool. If automated near-instant decryption techniques do not work or are not available, the user is notified that longer-term decryption techniques may be required. At that time, the user is also prompted for additional malicious tool traffic, any intrusion analysis notes, otherwise derived cryptographic keys, or infecting malicious tool to enable otherwise possibly impossible or extremely resource and time intensive decryption processing. The invention has a variety of automated processing that attempts to extract the cryptographic keys required for decryption from collateral information. This processing of collateral information for key extraction may be fully automated, causing the malicious tool traffic to be reinjected to the processor for decryption. If automated processes for key extraction fail, the invention can optionally utilize a variety of longer-term analysis techniques to attempt decryption-enabling materials or techniques such as key extraction. All steps and estimated completion times, as possible, are communicated to the user via the Task Management interface.

Figure 12:
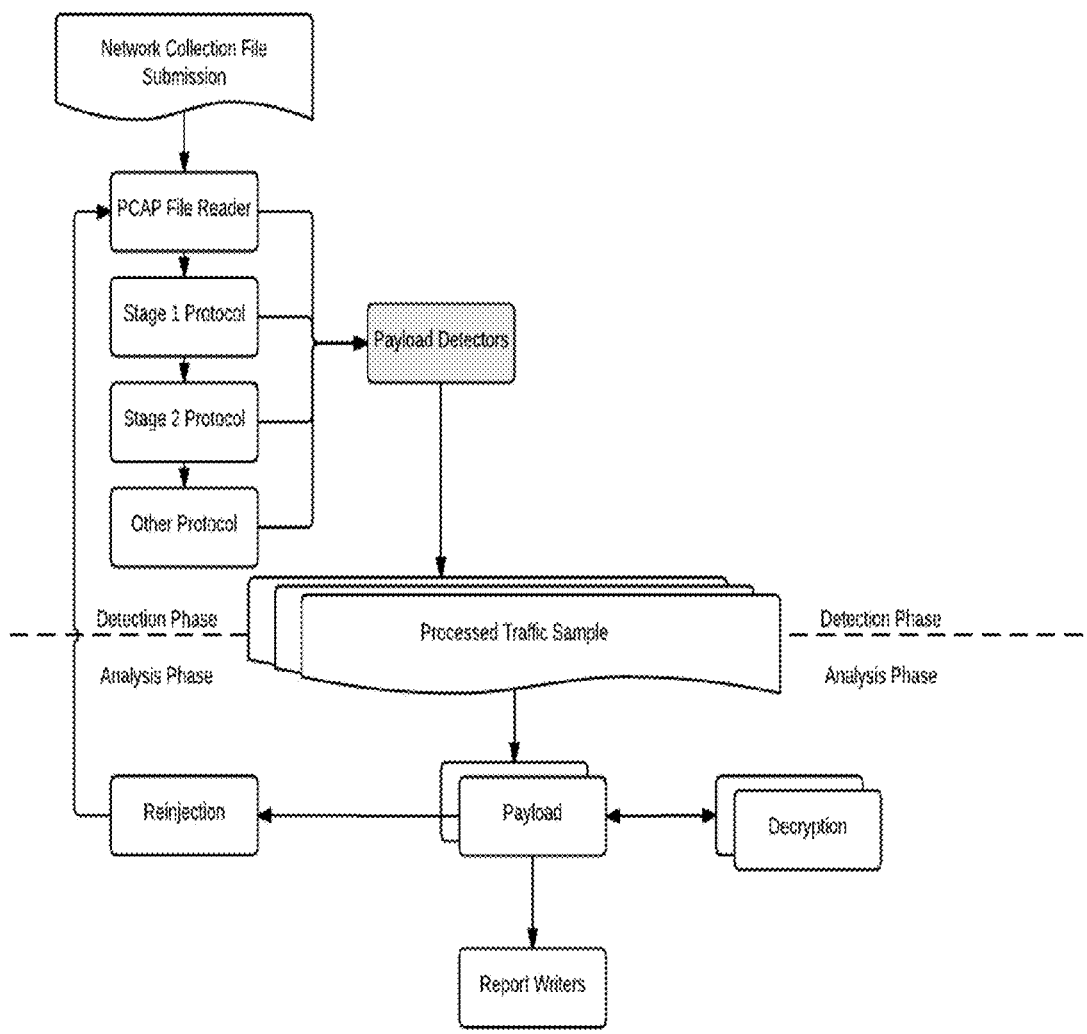
FIG. 12 is a block diagram of a nested protocol processing employed by the SaaS of FIG. 4.

FIG. 12 is a block diagram of a nested protocol processing employed by the SaaS of FIG. 4. Intrusion discovery will, for multiple reasons, result in periods of intense processing needs as customers require decoding of malicious communications, followed by periods of minimal activity. Cloud infrastructure will be leveraged to enable rapid deployment of upgrades for processing fixes, adapted processing when attackers modify existing APT malicious tools in between attacks, and automatic processing infrastructure scaling to meet processing demands within upper cost boundaries. The invention is positioned to process already collected cyber-attack tool messages. Therefore, there is little danger of the servers not being fast enough to process data in a timely manner, unlike some types of real time network collection and processing devices. A queue management system will be implemented to ensure that all customers receive reports in a timely manner.

APT network communications often use multiple encoding, obfuscation, data hiding, and encryption techniques, which require multi-stage identification and processing. In order to accurately report detailed information about the attack, the network communication protocols used by the malware must be processed into a usable format. The invention employs reusable processing blocks to perform nested protocol processing, decoding, and decryption that is necessary to transform the data into a format that is suitable for reporting. Protocol processors also extract appropriate metadata to provide key information used in reporting.

The invention processes all protocol layers necessary for reassembly of the communication and exfiltration data for follow-on processing and reporting from the Physical Layer up to the Application Layer. This includes aspects such as defragmentation and sessionization when appropriate. Protocol processors are layer aware and will have access to all protocol fields necessary to detect and extract all relevant information produced by the malware. The invention handles proprietary and non-standard protocols. It also processes off-line network traffic where an existing protocol is used in ways that violate existing industry standards such as Internet Engineering Task Force (IETF) Request for Comments (RFC) specifications.

When the protocol being processed uses an encoding scheme to transmit or obfuscate data, the invention employs the appropriate decoding scheme in order to render the data suitable for follow-on processing or reporting. For example, the invention decodes Base64 encoding, uuencoding, and similar standard encoding schemes. The invention also handles non-standard encoding schemes that seek to obfuscate data, like Base64 encoding with non-standard alphabets, or bit reversals followed by Base64 encoding.

Figure 13:
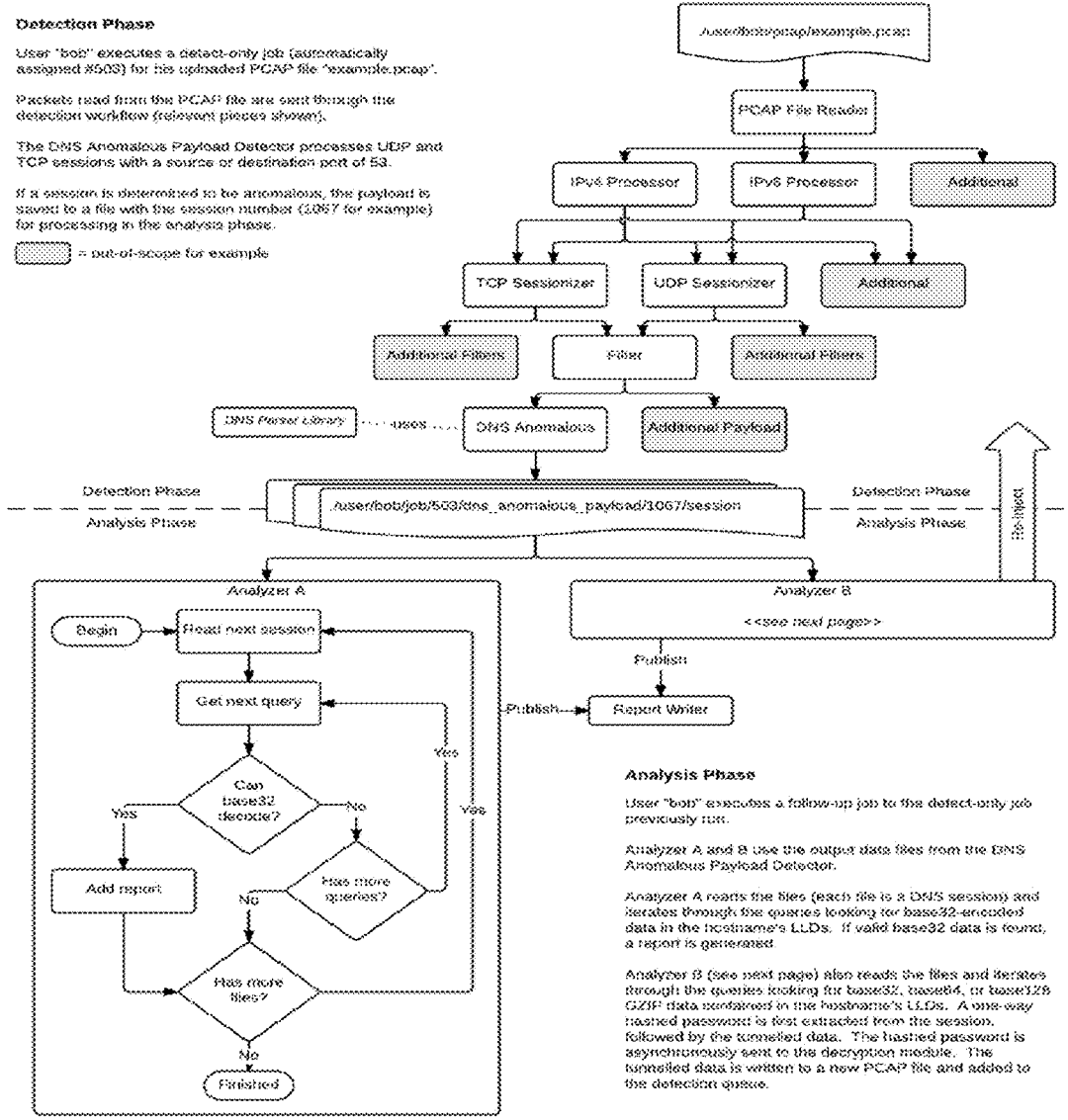
FIG. 13 is a flowchart of a DNS covert channel example with detection and analysis phases, which illustrates Analyzer A.

FIG. 13 is a flowchart of a DNS covert channel example with detection and analysis phases, which illustrates Analyzer A.

An organization's security monitoring software discovers a covert channel via notification by their network security-monitoring infrastructure. The organization's security team immediately begins collecting the traffic associated with the security notification, for submission to the invention for detailed automated intrusion analysis. The organization submits the off-line network traffic to identify possible processors, which will be able to generate an intrusion activity report. Since they first submit the traffic for only identification of possible malware processors, the invention reports two possible full processing modules for intrusion activity generation; one is a malicious tool protocol using the Domain Name System (DNS) protocol, and the other is a covert channel operating over DNS. Satisfied that a likely processor exists, the organization's security team chooses to submit the off-line network traffic for full processing.

The invention identifies two potential processors, and attempts to decode and decipher with each. Despite both candidate protocols consisting of DNS packets, the contents of the DNS packets are dissimilar depending on the malicious protocol using DNS. The invention's preprocessors recognize the DNS traffic and uses best-of-breed third-party and custom-developed DNS processing techniques as necessary to ensure the DNS traffic is correctly processed regardless of underlying Network-Layer fragmentation or Transport-Layer sessionization. The DNS traffic is parsed, then forwarded to Processor A and Processor B for further verification and intrusion activity processing.

Processor A examines the DNS messages, and searches for Base32 encoded commands in DNS queries of the Lowest Level Domain (LLD) portions of the DNS query hostnames. The Base32 decoder for Processor A, which attempts to decode the LLD portion of the hostnames, fails due to improper characters encountered. Processor A reports the failure to the Controller. Either the network collection is corrupt, the malware associated with Processor A has changed its protocol, or this is different malware not associated with the protocol processed by Processor A.

Processor B examines the DNS messages, and searches for traffic associated with a known DNS tunneling protocol, which has been used by Advanced Persistent Threat (APT) attackers. This protocol uses either Base32, Base64, or Base128 encoding of off-line network traffic that has been GZIP compressed. Like Processor A, information from the victim to the APT attacker consists of encoded information in the Lowest Level Domain (LLD) of the DNS query hostnames. Processor B identifies and extracts the MD5 hashed password while it is passed between the victim and the Attacker, as well as the version of the DNS covert channel tool. The version of the toot is "0.7.0".

Neither the tool version nor the APT Attacker password are necessary to continue extracting the intrusion activities, but both provide potential clues to possible attribution of the attacker or information that will assist law enforcement with tracking of other attacks. The tool version is, in this instance, trivial for Processor B to identify and extract. Exposing the hashed password requires additional processing. Processor B communicates the MD5 hash to the appropriate password decoder module, which uses a variety of brute force, dictionary, and hash precomputation (rainbow table) techniques to report back to Processor B the password used by the Attacker. In this case, the password is "медведь", which is Russian for "bear," possibly indicating the APT attacker in this case is of Russian origin.

Processor B continues extracting intrusion activity in parallel to the password and version number extraction. The Base32 and Base64 decoders both report failure due to the presence of improper characters, but the Base128 decoder reports success. Processor B then examines the traffic for GZIP compression, which succeeds. Processor B analyzes the uncompressed data and recognizes the protocol as a known DNS tunneling protocol consisting of header information for covert channel traffic maintenance and management. Processor B defragments and reassembles the traffic collected bidirectionally, upstream to the attacker and downstream to the victim. The processor is able to use the same traffic management techniques that allow the attacker to sustain exploitation actions against the target to decode and analyze their traffic. Processor B reconstructs the fragmented covert channel messages observed across many DNS packets, then analyzes the exposed and reassembled traffic, which indicates the underlying communications are IP packets. The extracted IP packets are marked with the appropriate metadata to tie them to the original DNS covert channel communications and are saved in PCAP format for return to the organization.

The extracted packets are then reinjected to the Controller for processing by all modules for possible malicious traffic processing, in the same processing and reporting flow a customer's off-line network traffic submission would take. The purpose of this is to examine the previously hidden network communications for possible malicious tool traffic, and for traffic indicators such as IP addresses and ports that are especially valuable when combined with the reporting done on the covert channel from Processor B. This second round of processing, performed on the extracted packets, results in the discovery of intrusion activity between the APT attacker and 12 IP addresses in the victim's network, despite the original traffic only appearing to come from the organization's one DNS server IP.

Throughout all stages of the processing, all information able to be extracted from the intrusion associated traffic is written to a report in a structured metadata format such as XML. IP addresses, TCP and UDP ports, all unique malware identifiers, and all malware commands and response codes are translated to human-readable formats. All metadata used in the DNS covert channel are preserved and reported, including extracted IP addresses, associated DNS hostnames, passwords, and implant identification values. This is in addition to the metadata preserved for the communications channel that was hidden under the encapsulating covert channel, which was also processed for victim and actor intrusion data.

Upon completion, the report is available to the organization either as a machine-readable report, or visible via the invention's Graphical User Interface (GUI). The organization reviews the report first via the GUI, and records the 12 IP addresses of the victims in their network. They correlate that information with functions of those machines, then examine the extracted, previously hidden network communications to see that the APT attackers exfiltrated data being analyzed for a Federal government contract, and the proprietary algorithm developed by the company for use in the contract. After the initial view of the GUI report, the organization downloads the programmatic report for ingestion in their enterprise security incident reporting framework, while submitting additional related intrusion traffic for expanded reporting.

Figure 14:
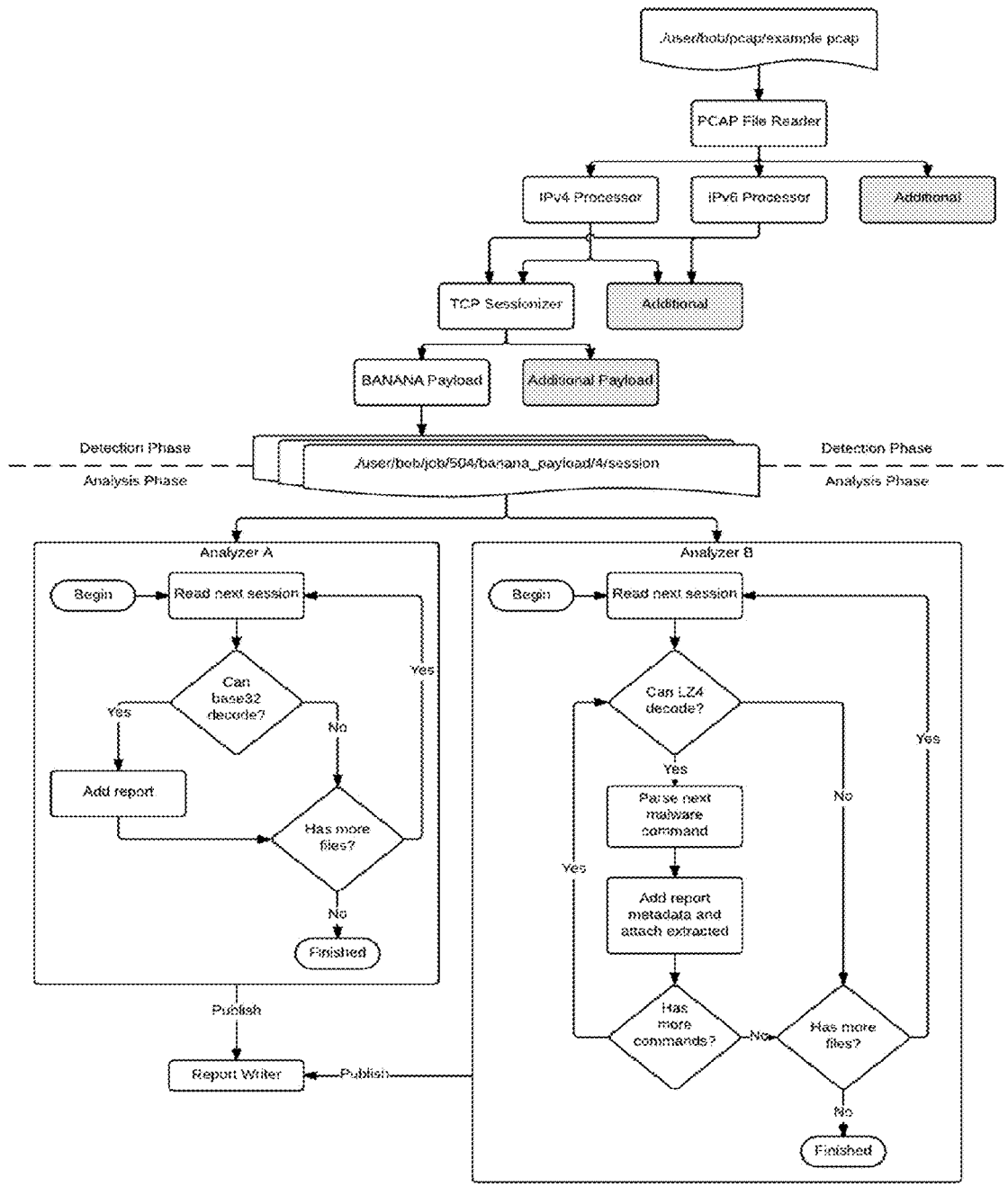
FIG. 14 is a flowchart of a DNS covert channel example with detection and analysis phases, which illustrates Analyzer A and B.

FIG. 14 is a flowchart of a DNS covert channel example with detection and analysis phases, which illustrates Analyzer A and B. An organization submits off-line network traffic that has been identified as malicious via their Intrusion Detection System. The organization's security team immediately begins to collect traffic associated with the Intrusion Detection System alert for submission for detailed automated intrusion analysis. The organization submits the off-line network traffic to identify possible processors, which will be able to generate an intrusion activity report. Since they first submit the traffic for only identification of possible malware processors, the invention reports two possible full processing modules for intrusion activity generation. Satisfied that a likely processor exists, the organization's security team chooses to submit the off-line network traffic for full processing.

The invention identifies two potential processors, and attempts to decode and decipher with each. Despite both candidate malware protocols consisting of TCP starting with the same keyword, "BANANA", the two protocols continue with dramatically different contents. Since both processors rely on TCP sessionization occurring before further processing may take place, the submitted PCAP files are processed to create TCP sessions from IP packets. Processor A and B both match the initial "BANANA" check, so the TCP sessions are forwarded to both processors for further analysis.

Processor A follows with GZIP compressed data that has been encoded with the standard Base32 encoding scheme. The Base32 decoder for Processor A, to expose the Gap compressed data, fails. The data is in the wrong format, so Processor A returns an error status to the Controller. Either the network collection is corrupt, the malware associated with Processor A has changed its protocol, or this is different malware not associated with the protocol processed by Processor A.

The invention's Processor B also checks for TCP data beginning with the keyword, "BANANA", but expects the following data to be LZ4 compressed. LZ4 decompression is attempted, which returns successfully with the decompressed malicious traffic. An additional check is conducted looking for the decompressed data to end with the string, "FINISHED", which returns successfully. This decompressed data is comprised of a command codeword for the malware, three colons, the unique identifier of the malware, three colons, then the contents of the command or results of the command from the victim machine, and lastly the string "FINISHED". In this case, the commands observed being sent to the victim are for Excel spreadsheets, and the off-line network traffic from them is labeled with the malware code as the file upload command response. The invention's Processor B automatically extracts the likely file contents, verifies what type of files were transmitted to the cyber attacker via examination of the Excel file header, and saves the file for delivery to the client during intrusion activity report delivery.

During this processing, all information able to be extracted from the intrusion associated traffic is written to a report in a structured metadata format such as XML. IP addresses, TCP ports, all unique malware identifiers, and all malware commands and response codes are translated to human-readable formats. All command contents sent to the victim are listed, such as the filenames for the attacker-controlled victim machine to upload to the attacker's servers. All command responses are also listed. In the case of files being uploaded to the attacker, links to the attached captured files are listed with either the real filename (when automated analysis can identify the filename), or with unique filenames (when the original filename cannot be ascertained). The invention's Processor B is able to associate the filenames in this case, so the report contains links to the files as they are named on the customer machine.

The report, once complete, is available for the submitting organization either as a machine-readable report, or visible via the invention's Graphical User Interface (GUI). The organization reviews the report first via the GUI, and uses the report search functionality to search for strings associated with the company classified project, and for data associated with the company's credit card processing, to confirm which data was lost to the attackers. Additionally, the customer's information security personnel uses the generated intrusion activity report to quickly identify that there are seven pieces of malware on seven identified machines. After the initial view of the GUI report, the organization downloads the programmatic report for ingestion in their enterprise security incident reporting framework, while submitting additional related intrusion traffic for expanded reporting.

Figure 15:
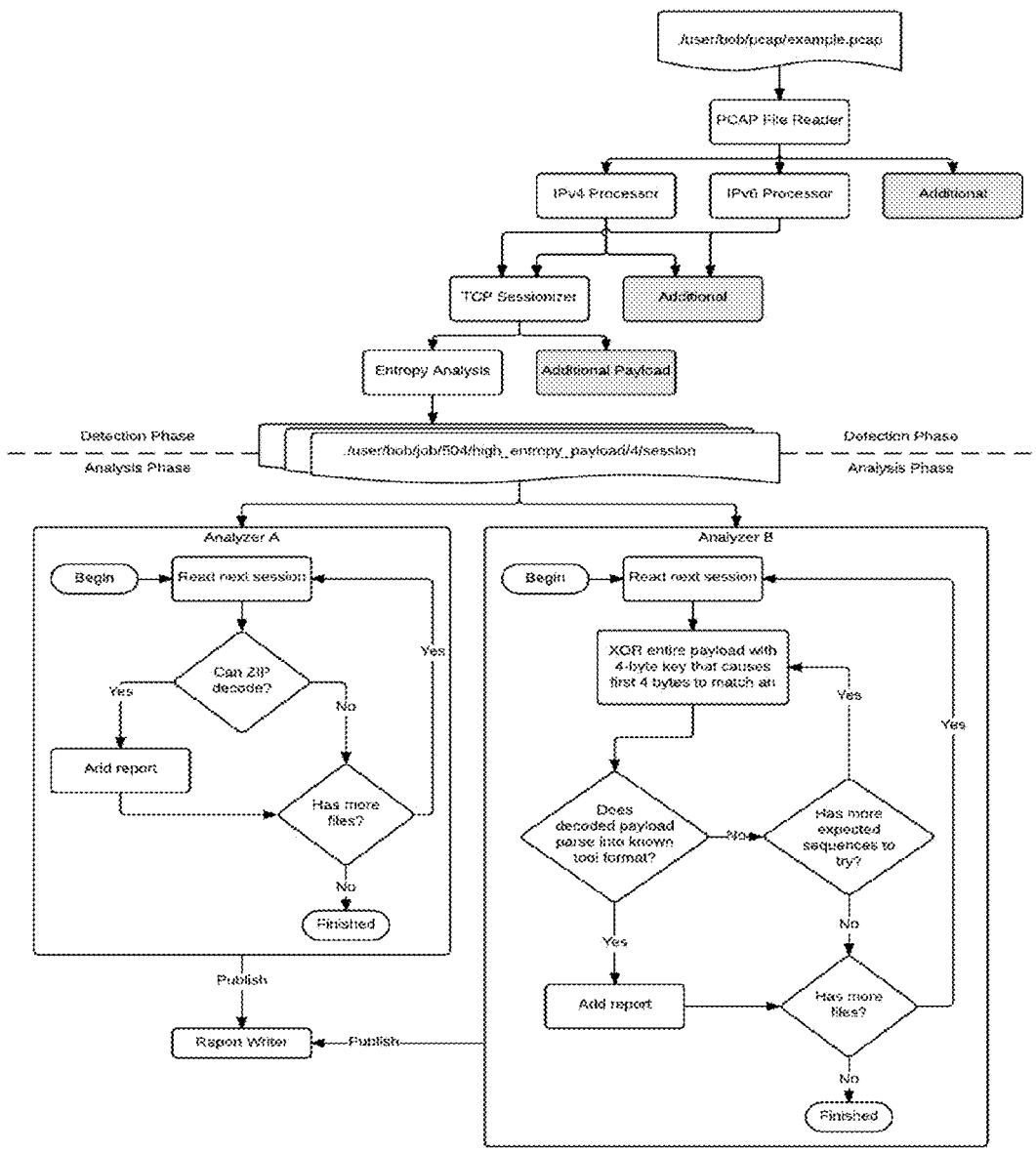
FIG. 15 is a flowchart of a DNS covert channel example with detection and analysis phases, which illustrates Analyzer A and B, wherein Analyzer B uses a four byte XOR.

FIG. 15 is a flowchart of a DNS covert channel example with detection and analysis phases, which illustrates Analyzer A and B, wherein Analyzer B uses a four byte XOR. An organization submits traffic that has been identified as malicious via their Intrusion Detection System. The organization's security team immediately begins collecting traffic associated with the Intrusion Detection System alert, for submission for possible detailed automated intrusion analysis. The organization submits the off-line network traffic to identify possible processors, which will be able to generate an intrusion activity report. The invention reports two possible full processing modules for intrusion activity generation, and the organization's security team chooses to submit the off-line network traffic for full processing.

The invention identifies two possible processors and attempts to decode the data with each of them. Because both processors expect to receive data that is somewhat random in nature, there are no known patterns within the data to identify which processor should be run. The invention can quickly verify if the ZIP variant is used by attempting decompression, so it chooses to run that processor first. Processor A attempts to process the reconstructed TCP stream as a slightly modified ZIP archive. The malware that produces this variant removes the first four bytes of the ZIP file (referred to as 'magic bytes') to avoid detection, but leaves the ZIP file Central Directory at the end of the file. Processor A uses the invention's entropy check module to identify that the contents of the off-line network traffic is likely ZIP file data up to the Central Directory. Processor A dissects the Central Directory, prepends the magic bytes common to a ZIP archive to the reconstructed TCP stream, then attempts to decompress the assumed ZIP file. The decompression routine fails to decompress the data and returns an error code indicating an unsuccessful decode.

Processor B is associated with an attack tool protocol, which uses a four byte XOR on all transmitted data. Previous discovered attacks with this tool have shown that the APT actors change the XOR key Cryptographic Variable every attack, but the underlying encrypted commands and responses to and from victim and attack infrastructure are always the same. The invention's Processor B has pre-computed all 256 possible ciphertext of the seven commands, which would begin the TCP session. Processor B checks the first portion of the HTTP POST contents against the list of all possible ciphertext samples. Processor B's comparison is successful, and identifies the four byte key associated with the ciphertext as 0xDE 0xAD 0xBE 0xEF. Processor B communicates the intrusion off-line network traffic to a decryption module, which decrypts all HTTP POST contents using the key 0xDE 0xAD 0xBE 0xEF. The decryption module returns the decrypted traffic to Processor B, with the now exposed commands and responses from the intrusion activity communication available for parsing and reporting. Processor B begins processing the intrusion activity bidirectionally to and from the victim network, and writing results to the intrusion report.

The report, once complete, is available for the organization either as a machine-readable report, or visible via the invention's Graphical User Interface (GUI). The organization reviews the report first via the GUI, and views the decoded PDF file to discover what data was lost to the attackers. Additionally, the organization's information security personnel use the invention's generated intrusion activity report to quickly identify that there are seven pieces of malware on seven identified machines. Intrusion activity reporting revealed that the attacker exfiltrated all internal pricing records and unsubmitted provisional patent documentation on the network, due to file server connections established to those seven machines. After the initial view of the GUI report, the organization downloads the programmatic report for ingestion in their enterprise security incident reporting framework, while submitting additional related intrusion traffic for expanded reporting.

Figures 16A, 16B:
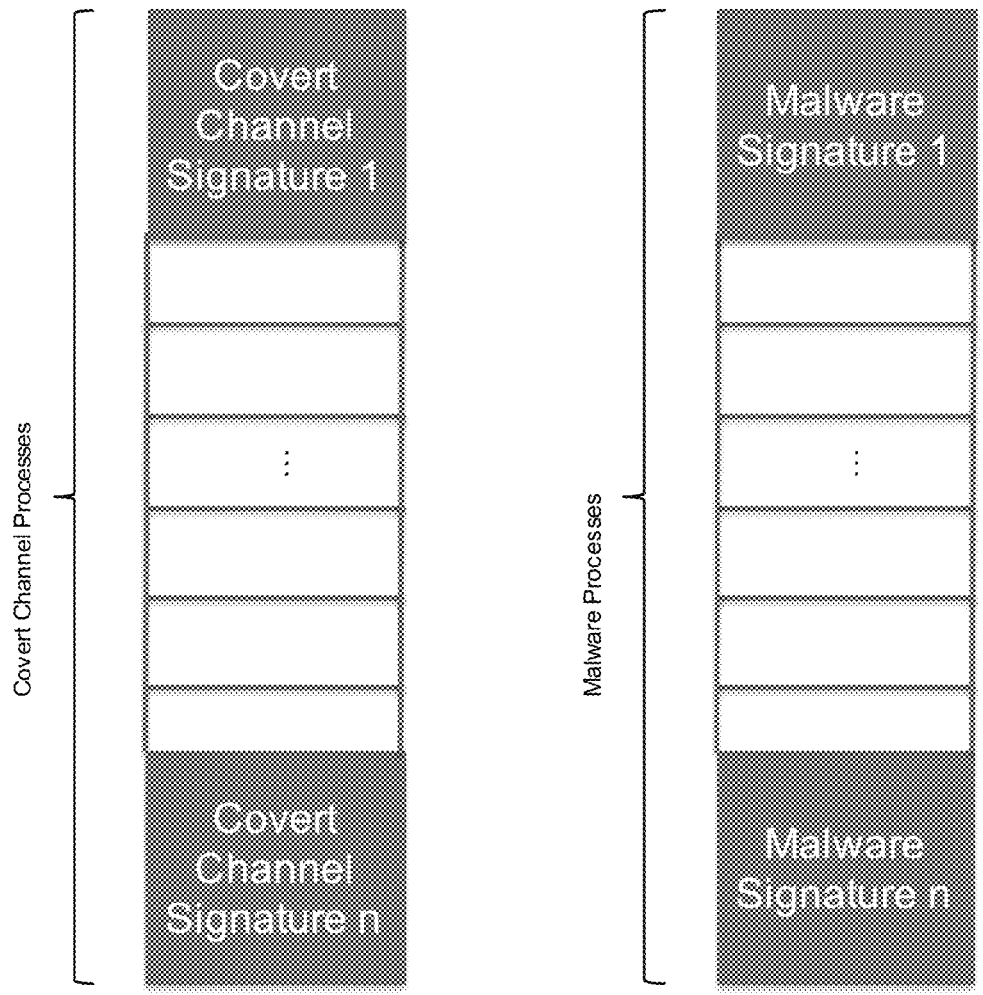
FIG. 16*a* depicts covert channel processes.
FIG. 16*b* depicts malware processes.

FIG. 16a depicts covert channel processes within the standard protocol stack. The stack comprises a variety of standard layers 1 through n. Each layer of the protocol stack has its own covert channel signature 1 through n. APT tools sometimes use covert channels that may be employed in any of the layers of the protocol stack and may abuse standard protocols to avoid detection. The invention extracts covert channels from the layer they are transmitted in as a part of the protocol processing. The invention's covert channel processors are able to identify and extract covert channel information at any portion of the protocol stack. For example, if the malicious software hides its exfiltration data within a covert channel within an IP header, Internet Control Message Protocol (ICMP) message, or Domain Name System (DNS) message, the processing algorithm receives the incoming data in PCAP format, and extracts the data out of the covert channel accordingly.

FIG. 16b depicts malware processes within the standard protocol stack. The stack comprises a variety of standard layers 1 through n. Each layer of the protocol stack has its own malware signature 1 through n.

Figure 17A:
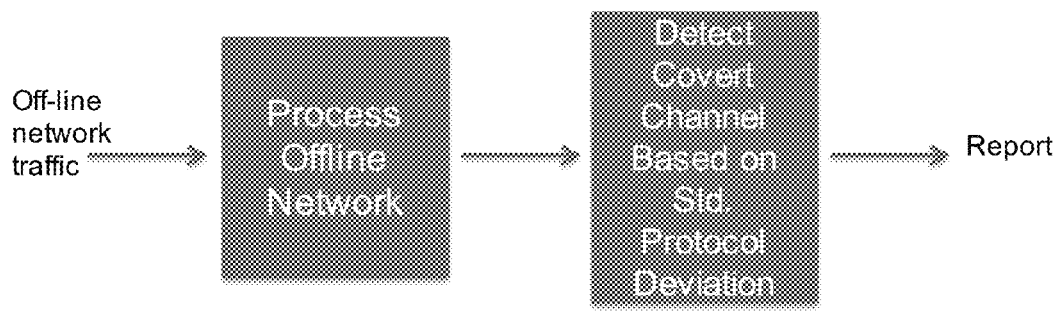
FIG. 17*a* is a covert channel processes flowchart.

FIG. 17a is a covert channel processes flowchart. A covert channel deviation can be at any one or more layers of a standard protocol stack. Off-line network traffic is submitted to the SaaS of FIG. 4. Off-line network traffic is processed. Detection of covert channel is based on standard protocol deviation. Once the process is complete, a report is generated.

Figure 17B:
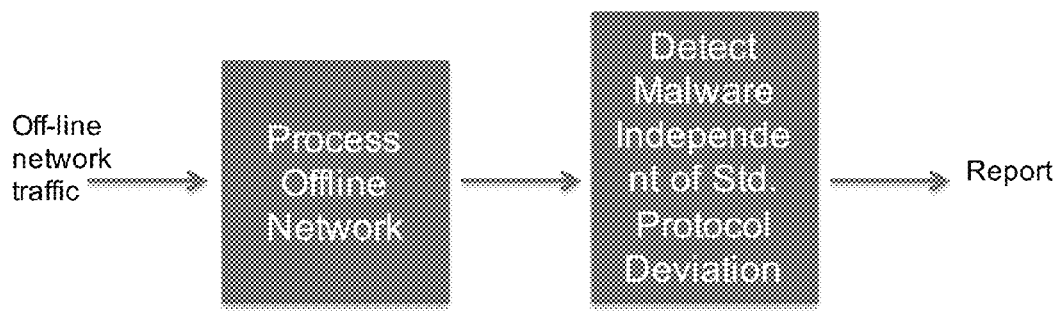
FIG. 17*b* is a malware processes flowchart.

FIG. 17b is a malware processes flowchart. A malware attack tool against a target uses the standard protocol stack for message communication without deviation from the standard protocol. Off-line network traffic is submitted to the SaaS of FIG. 4. Off-line network traffic is processed. Detection of malware is independent of standard protocol deviation. Once the process is complete, a report is generated.

The invention claimed is:

1. A system for network intrusion detection, comprising:
one or more servers configured to receive off-line network traffic, said off-line network traffic having a predefined format capable of indicating existence of a plurality of covert channels associated with a corresponding plurality of covert channel signatures, wherein each covert channel comprises a tool that communicates messages by deviating from a standard network protocol to avoid detection; and
a plurality of covert channel processors configured to analyze said off-line network traffic, said analysis comprising determining whether the off-line network traffic deviates from the standard network protocol based on one or more covert channel signatures.

2. The system of claim 1, further comprising a plurality of malware processors configured to analyze said off-line network traffic to detect malware, wherein a malware uses the standard network protocol without deviation.

3. The system of claim 1, further comprising a plurality of steganography processors configured to analyze said off-line network traffic to detect steganography.

4. The system of claim 1, further comprising a plurality of Potentially Unwanted Program (PUP) processors configured to analyze said off-line network traffic to detect PUPs.

5. The system of claim 1, wherein the off-line network data traffic comprises at least one standard network protocol stack having multiple standard layers.

6. The system of claim 5, wherein the covert channels is employed in at least one standard network layer of the standard network protocol stack.

7. The system of claim 6, wherein the at least one standard network layer comprises one of HTTP or TCP/IP.

8. The system of claim 1, wherein the off-line network traffic is analyzed at two levels comprising a first level and a second level, wherein;
at the first level analysis, a deviation is detected based on a covert channel signature; and
at the second level, analysis comprises of at least one of decryption processes, key-in processes, administration detection processes, header checking processes, or field checking processes in the standard.

9. The system of claim 1, wherein the predefined format of network data traffic is a PCAP file.

10. A method for network intrusion detection, comprising:
receiving off-line network traffic, said off-line network traffic having a predefined format capable of indicating existence of a plurality of covert channels associated with a corresponding plurality of covert channel signatures, wherein each covert channel comprises a tool that communicates messages by deviating from a standard network protocol to avoid detection; and
determining whether the off-line network traffic deviates from the standard network protocol based on one or more covert channel signatures.

11. The method of claim 10, further comprising analyzing said off-line network traffic to detect malware, wherein a malware uses the standard network protocol without deviation.

12. The method of claim 10, further comprising analyzing said off-line network traffic to detect steganography.

13. The method of claim 10, further comprising analyzing said off-line network traffic to detect PUPS.

14. The method of claim 10, wherein the off-line network data traffic comprises at least one standard network protocol stack having multiple standard network layers.

15. The method of claim 14, wherein the covert channels is employed in at least one standard network layer of the standard network protocol stack.

16. The method of claim 15, wherein the at least one standard network layer comprises one of HTTP or TCP/IP.

17. The method of claim 10, wherein the off-line network traffic is analyzed at two levels comprising a first level and a second level, wherein; at the first level analysis, a deviation is detected based on a covert channel signature; and at the second level, analysis comprises of at least one of decryption processes, key-in processes, administration detection processes, header checking processes, or field checking processes in the standard.

18. The method of claim 10, wherein the predefined format of network data traffic is a PCAP file.

* * * * *